United States Patent
Loeillet et al.

(10) Patent No.: US 10,229,595 B2
(45) Date of Patent: Mar. 12, 2019

(54) VEHICLE INTERFACE DEVICE

(71) Applicant: Jaguar Land Rover Limited, Coventry, Warwickshire (GB)

(72) Inventors: Jean-Jacques Loeillet, Coventry (GB); Andrew Chatwin, Coventry (GB); Andy Wells, Coventry (GB); Alan Trevana, Coventry (GB); Frazer McKimm, Coventry (GB); Conor Duff, Coventry (GB); Guido Astorri, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 0 days.

(21) Appl. No.: 15/540,153

(22) PCT Filed: Jan. 14, 2016

(86) PCT No.: PCT/EP2016/050653
§ 371 (c)(1),
(2) Date: Jun. 27, 2017

(87) PCT Pub. No.: WO2016/113345
PCT Pub. Date: Jul. 21, 2016

(65) Prior Publication Data
US 2018/0005528 A1   Jan. 4, 2018

(30) Foreign Application Priority Data

Jan. 14, 2015 (GB) .................................. 1500590.3
Jan. 14, 2015 (GB) .................................. 1500591.1
Jan. 14, 2015 (GB) .................................. 1500592.9

(51) Int. Cl.
*B60Q 9/00* (2006.01)
*G08G 1/16* (2006.01)

(52) U.S. Cl.
CPC .................. *G08G 1/16* (2013.01); *B60Q 9/00* (2013.01); *B60Q 9/008* (2013.01); *G08G 1/165* (2013.01); *G08G 1/166* (2013.01)

(58) Field of Classification Search
CPC .......... G08G 1/16; G08G 1/165; G08G 1/166; B60Q 9/00; B60Q 9/008
(Continued)

(56) References Cited

U.S. PATENT DOCUMENTS 8,698,639 B2 *  4/2014  Fung ...................... G08G 1/166
                                                    340/576
9,671,826 B2 *  6/2017  Levesque ................ G06F 1/163
(Continued)

FOREIGN PATENT DOCUMENTS

DE   102007057725 A1   6/2008
DE   102009005260 A1   7/2010
(Continued)

OTHER PUBLICATIONS

Combined Search and Examination Report, GB Application No. 1500590.3, dated Jun. 12, 2015, 8 pages.
(Continued)

Primary Examiner — John A Tweel, Jr.
(74) Attorney, Agent, or Firm — Myers Bigel, P.A.

(57) ABSTRACT

The present disclosure relates to a vehicle interface device configured to output a haptic signal to indicate a potential hazard. The apparatus includes at least one haptic generator configured to generate a haptic signal; and a processor for controlling the haptic generator. The processor is configured to determine an angular position of the identified object relative to the vehicle in dependence on object data relating to an identified object representing a potential hazard. A control signal is generated to cause the haptic generator to output a haptic signal for providing an indication of the
(Continued)

determined relative position of the identified object. The control signal is modified to progressively change the generated haptic signal to represent changes in the relative angular position of the identified object. The present disclosure also relates to a vehicle incorporating a vehicle interface device.

20 Claims, 13 Drawing Sheets

(58) Field of Classification Search
USPC .......................................................... 340/435
See application file for complete search history.

(56) References Cited

U.S. PATENT DOCUMENTS

| | | | |
|---|---|---|---|
| 9,827,904 B2 * | 11/2017 | Modarres | ............... B60Q 9/008 |
| 2005/0258977 A1 | 11/2005 | Kiefer et al. | |
| 2010/0198458 A1 | 8/2010 | Buttolo et al. | |
| 2011/0054756 A1 | 3/2011 | Hecker et al. | |
| 2011/0234422 A1 | 9/2011 | Yamashita | |
| 2012/0081219 A1 | 4/2012 | Schiebahn | |
| 2013/0286205 A1 | 10/2013 | Okada et al. | |
| 2014/0118130 A1 | 5/2014 | Chang et al. | |
| 2014/0368650 A1 | 12/2014 | Ray et al. | |
| 2015/0025787 A1 | 1/2015 | Lehner et al. | |
| 2015/0145694 A1 | 5/2015 | Dupont | |

FOREIGN PATENT DOCUMENTS

| | | | | |
|---|---|---|---|---|
| DE | 102009005688 A1 | | 7/2010 | |
| DE | 102011121392 A1 * | | 6/2013 | ............. B60Q 9/008 |
| JP | 2002274216 A | | 9/2002 | |
| JP | 2008139734 A | | 6/2008 | |
| JP | 2009154641 A | | 7/2009 | |
| JP | 2013152554 A | | 8/2013 | |
| WO | WO 2007/049995 A1 | | 5/2007 | |

OTHER PUBLICATIONS

Combined Search and Examination Report, GB Application No. 1500592.9, dated Jun. 29, 2015, 7 pages.
Combined Search and Examination Report, GB Application No. 1500591.1, dated Jul. 7, 2015, 7 pages.
Notification of Transmittal of the International Search Report and the Written Opinion of the International Searching Authority, or the Declaration, PCT/EP2016/050653, dated Mar. 18, 2016.

* cited by examiner

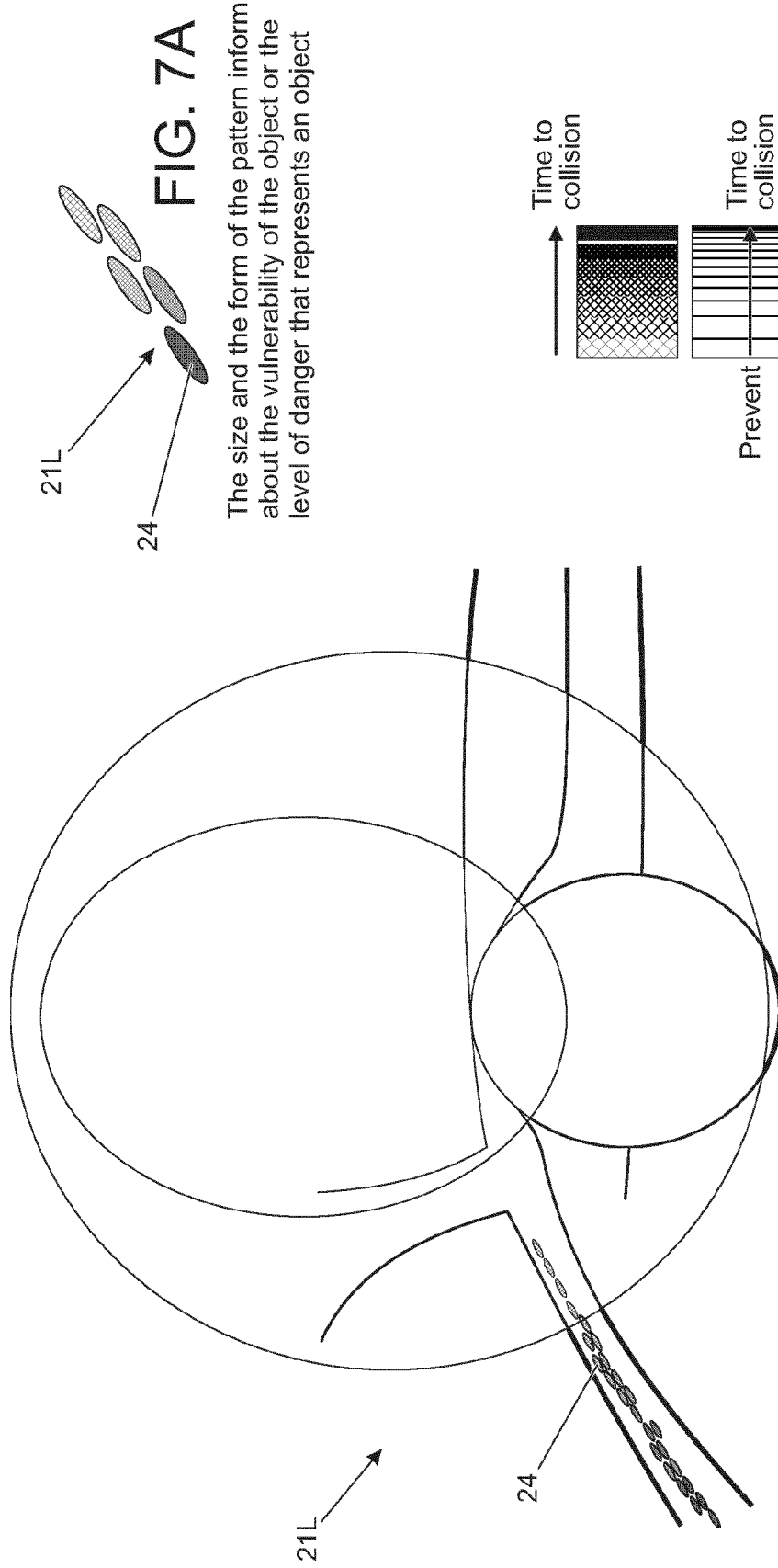
FIG. 5
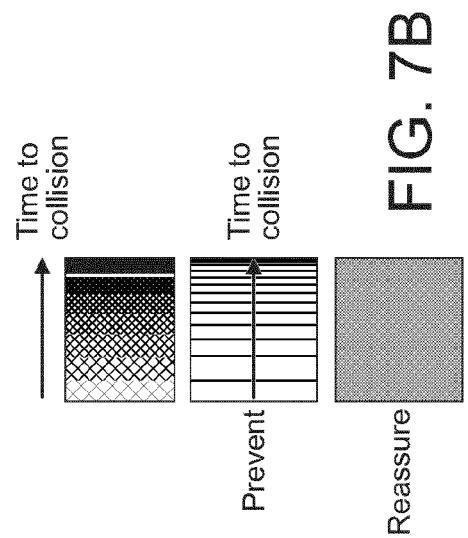
FIG. 7A
The size and the form of the pattern inform about the vulnerability of the object or the level of danger that represents an object
FIG. 7B

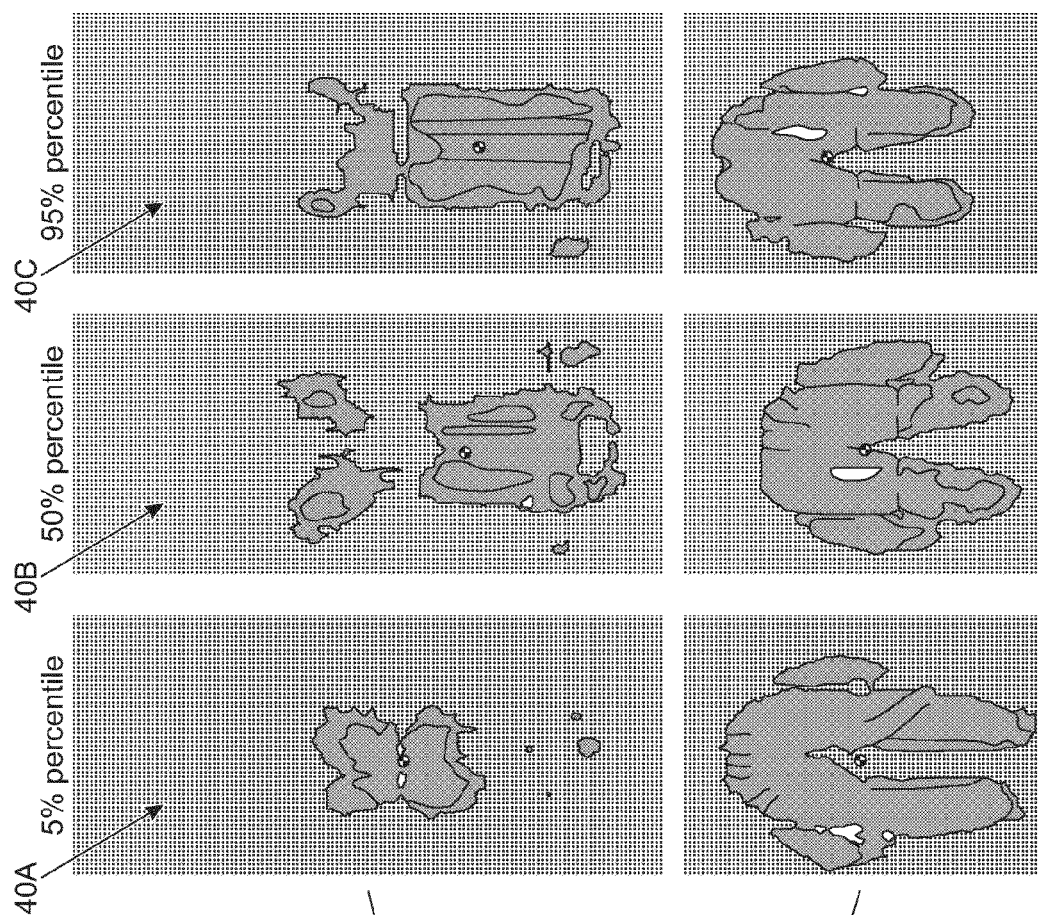
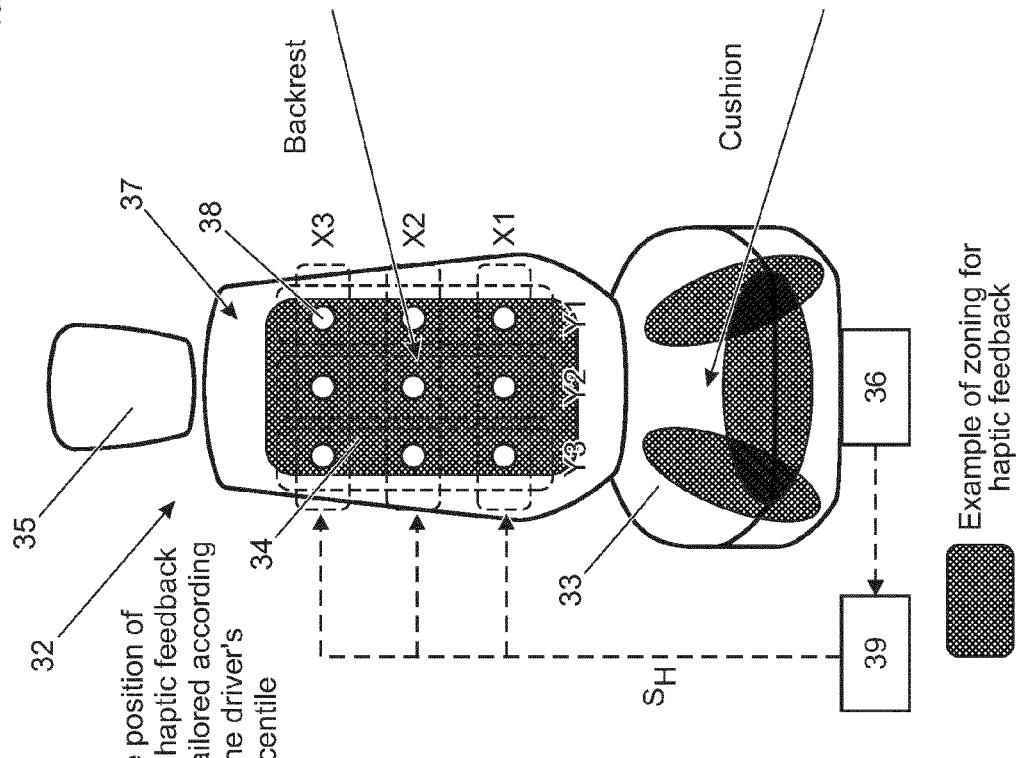
FIG. 10
FIG. 11A  FIG. 11B  FIG. 11C

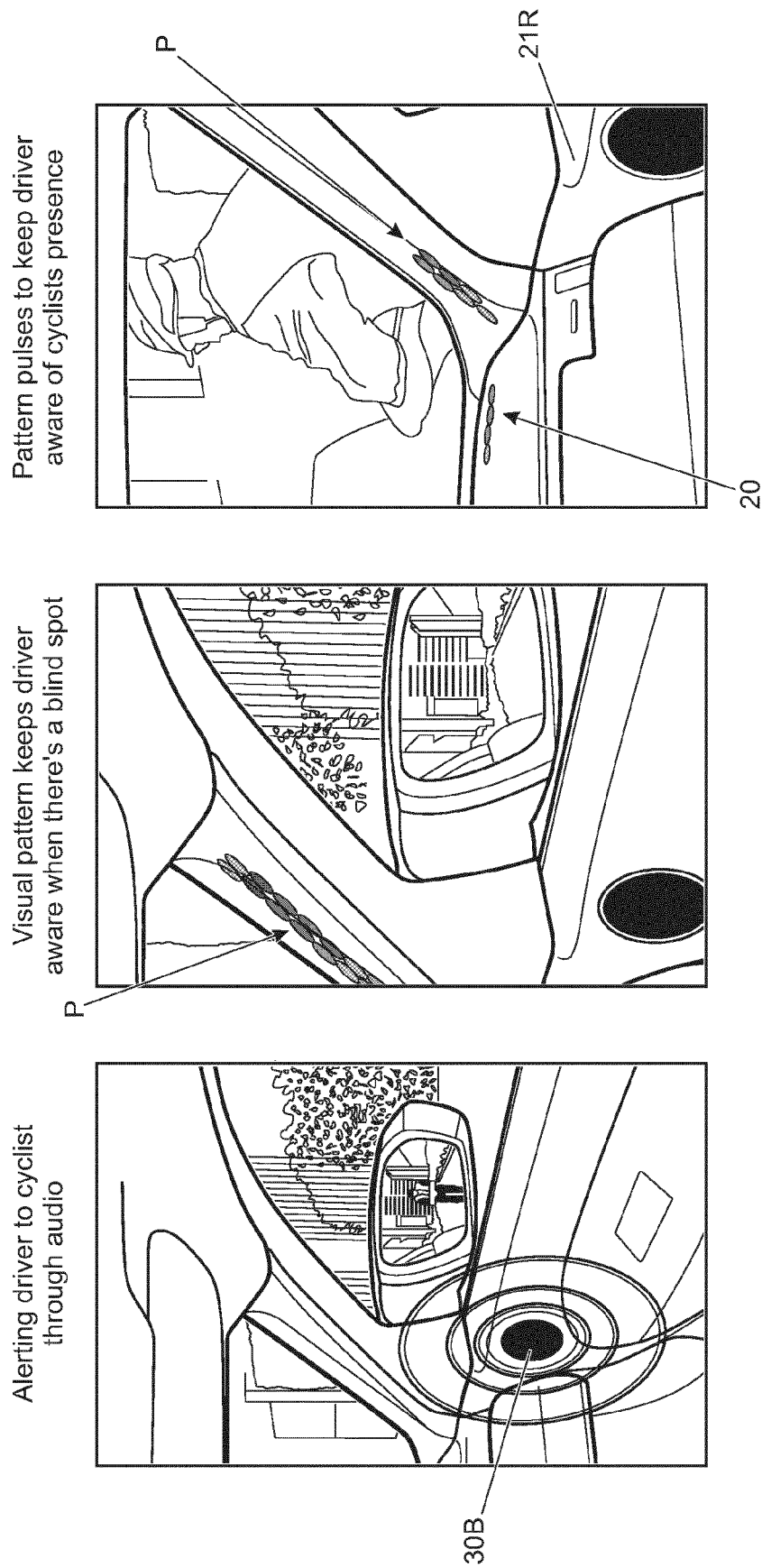

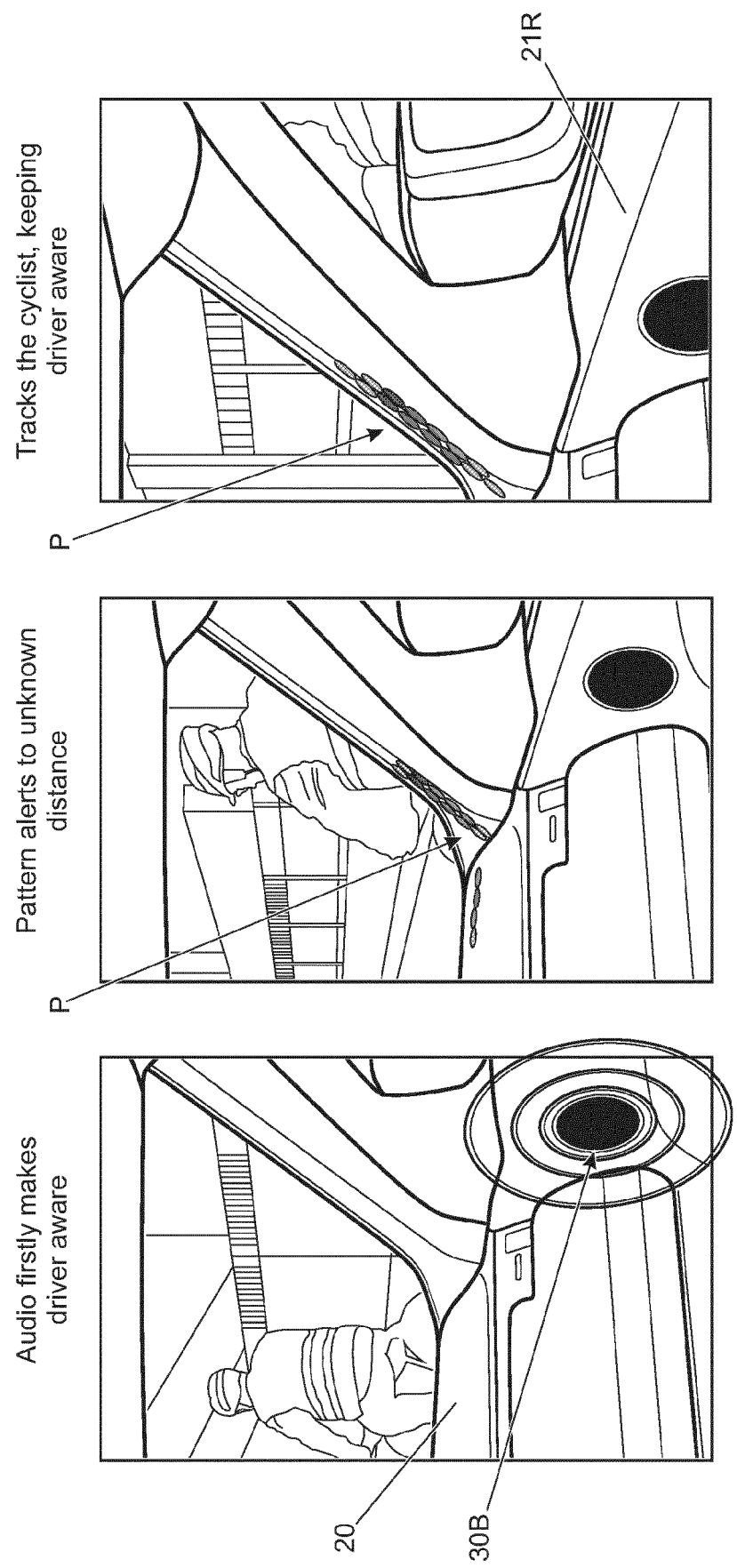

VEHICLE INTERFACE DEVICE

RELATED APPLICATIONS

This application is a 35 U.S.C. § 371 national stage application of PCT Application No, PCT/EP2016/050653, filed on Jan. 14, 2016, which claims priority from Great Britain Patent Application No. 1500590.3 filed on Jan. 14, 2015, Great Britain Patent Application No. 1500592.9 filed on Jan. 14, 2015, and Great Britain Patent Application No. 1500591.1 filed on Jan. 14, 2015, the contents of which are incorporated herein by reference in their entireties. The above-referenced PCT international Application was published in the English language as international Publication No. WO 2016/113345 A1 on Jul. 21, 2016.

TECHNICAL FIELD

The present disclosure relates to a vehicle interface device; to a vehicle having an interface device; and to a method of generating a haptic indication.

BACKGROUND

The activity of driving a vehicle can prove stressful. According to the driving situation, the driver can be distracted or have a high level of mental workload. These situations can be classified in a number of different ways, for example:

Driving environment (urban, motorway, parking, etc.);
Conditions (weather, traffic, noise, light, etc.); and
Status of the vehicle (speed, level of fuel, presence of warning, etc.).

To reduce driver workload, there are numerous developments to the Advanced Driver Assistance System (ADAS) provided in modern vehicles. These developments result in the generation of new information to be conveyed to the driver. This presents a risk of visual clutter and may render the information difficult to understand or potentially incomprehensible. It is envisaged that future ADAS will be connected with their environment in order to identify the driving context and to help driver awareness. This will generate additional information to be conveyed to the driver of the vehicle.

It is against this background that the present invention has been conceived. At least in certain embodiments the present invention seeks to provide a vehicle having an interface device which overcomes or ameliorates at least some of the shortcomings.

SUMMARY OF THE INVENTION

Aspects of the present invention relate to a vehicle having an interface device; to a vehicle interface device; and to a method of generating a haptic indication.

According to a further aspect of the present invention there is provided a vehicle interface device for generating a haptic indication of a potential hazard, the vehicle interface device comprising:
at least one haptic generator configured to generate a haptic signal; and
a processor for controlling said haptic generator;
wherein the processor is configured to:
in dependence on object data relating to an identified object representing a potential hazard, determine an angular position of the identified object relative to the vehicle;
generate a control signal to cause the haptic generator to output a haptic signal for providing an indication of the determined relative position of the identified object; and
modify the control signal to progressively change the generated haptic signal to represent changes in the relative angular position of the identified object.

The vehicle interface device outputs a haptic signal to notify the vehicle driver of an identified object which represents a potential hazard. By progressively changing the haptic signal, the interface provides a substantially continuous indication of the position of the identified object in relation to the vehicle. The haptic signal can be controlled to mirror changes in the determined position of the identified object in relation to the vehicle. The interface can, at least in certain embodiments, facilitate identification and assessment of the hazard posed by the identified object.

The vehicle interface device can provide an awareness of a potential hazard in terms of one or more of the following: position, trajectory, nature, criticality, etc. The haptic signal generated by the vehicle interface device can convey information, for example using one or more of the following strategies: frequency and/or magnitude to represent criticality of the potential hazard; position (i.e. the location of the potential hazard); motion (trajectory of the potential hazard); and controlling a signature of the haptic signal to indicate the nature of the identified object. At least in certain embodiments, these strategies can provide an intuitive interface capable of providing improved awareness of a potential hazard in order to facilitate prevention of an accident.

The identified object data can define the position of the identified object. The position of the identified object can be defined using a coordinate system, for example defined in relation to a virtual reference point. The speed and/or acceleration of the identified object can be determined by monitoring changes in the position of the identified object with respect to time, or the rate of change of the position of the identified object. The processor can be configured to determine the absolute speed and/or acceleration of the identified object (using the vehicle speed and/or direction of travel); or can be configured to determine the relative speed and/or acceleration of the identified object.

The processor can be configured to receive said object data from sensor means disposed on the vehicle. The sensor means can be configured to monitor a region external to the vehicle to identify the identified object. The sensor means can comprise one or more of the following set: one or more ultrasonic sensors; one or more capacitive sensors; one or more optical sensors; and one or more radar sensors. The sensor means can, for example, form part of an advanced driver aid system (ADAS). By way of example, ADAS can comprise one or more of the following: a camera (surround view, lane departure warning, park assistance); stereo camera (pedestrian detection); long-range radar (Adaptive Cruise Control); short/medium-range radar (blind spot detection).

Alternatively, or in addition, the vehicle can comprise a receiver for receiving the identified object data. The receiver can be a wireless receiver for receiving a wireless transmission, for example a radio frequency (RF) transmission. The identified object data can be transmitted from another vehicle as part of a vehicle-to-vehicle (V2V) communication; or from infrastructure as part of an infrastructure-to-vehicle (I2V) communication. The identified object data could be transmitted from another vehicle to indicate the position of that vehicle or the position of another vehicle. The identified object data could be transmitted by the infrastructure to indicate the position and/or movements of one or more other vehicles in the vicinity of the vehicle.

The vehicle can comprise a plurality of said haptic generators. The processor can be configured to control activation of said haptic generators to represent changes in the direction to the identified object from the vehicle.

The at least one haptic generator can comprise a vibration generator.

Alternatively, or in addition, the at least one haptic generator can comprise an ultrasonic transducer for generating an ultrasonic signal. The ultrasonic transducer can be configured to enable control of the output direction of said ultrasonic signal. The output direction of the ultrasonic signal can be controlled to represent changes in the direction to the identified object from the vehicle. The haptic generator can be configured to direct said ultrasonic signal towards an occupant of the vehicle, such as a driver.

The at least one haptic generator can be disposed within a seat in the occupant compartment. The at least one haptic generator can be disposed in the seat cushion and/or the seat squab and/or the headrest. The vehicle can comprise means for determining occupant contact with the seat. The occupant contact determining means can, for example, be in the form a weight sensor or a contact sensor, such as a capacitive sensor or a resistive sensor. Alternatively, or in addition, an occupant facing camera could be used to categorise the seat occupant to estimate occupant contact with the seat. The processor can be configured to control activation of said at least one haptic generator in dependence on the determined occupant contact with the seat.

The at least one haptic generator can comprise an air vent for generating the haptic signal in the form of a jet of air. The jet of air can be generated by a fan, for example part of the heating, ventilation and air conditioning (HVAC) system. The air vent can be controllable in dependence on the haptic control signal. For example, the direction and/or magnitude of the jet of air can be controlled. The air vent can comprise an adjustable nozzle for controlling the direction of the jet of air to represent changes in the direction to the identified object from the vehicle. A plurality of said air vents can be provided. The air vents can be selectively activated to represent changes in the direction to the identified object from the vehicle.

The processor can be configured to determine a position of the identified object in dependence on the identified object data. The processor can modify the haptic signal in dependence on the determined position of the identified object.

The processor can be configured to determine a trajectory of the identified object in dependence on the identified object data. The processor can be configured to modify the haptic signal in dependence on the determined trajectory.

The processor can be configured to determine a time to collision in dependence on the identified object data. The processor can be configured to modify the haptic signal in dependence on the determined time to collision.

The processor can be configured to determine a nature of the identified object in dependence on the identified object data. The processor can be configured to modify the haptic signal in dependence on the determined nature of the identified object. For example, the haptic signal could be modified in dependence on the determined nature of the identified object. A first haptic signal can be output if the identified object is identified as another vehicle. A second haptic signal can be output if the identified object is identified as a cyclist. A third haptic signal can be output if the identified object is identified as a pedestrian. A fourth haptic signal can be output if the identified object is identified as an animal. The haptic signals can provide unique identifiers to enable the driver of the vehicle to differentiate between the haptic signals to determine the nature of the identified object.

The processor can be configured to determine a speed of the identified object in dependence on the identified object data. The processor can modify the haptic signal in dependence on the determined speed of the identified object.

The processor can be configured to determine a hazard level (criticality) in dependence on the identified object data. The processor can be configured to modify the haptic signal in dependence on the determined hazard level.

The processor can be configured to modify the haptic signal by changing one or more of the following parameters: amplitude, frequency, magnitude, haptic pattern; and pattern form.

The processor can be configured to receive driver status data. The driver status data can, for example, be generated by driver monitoring means, for example to determine gaze direction and/or head pose. The driver monitoring means can, for example, be in the form of an optical camera coupled to an image processing unit. The processor can be configured to change the haptic signal in dependence on the gaze direction and/or head pose of the driver. For example, the spatial position of the haptic signal could be varied.

The vehicle interface device can also be suitable for generating a visual indication of a potential hazard, the vehicle interface device comprising:
　display means configured to extend around at least a portion of a perimeter of an occupant compartment in a vehicle; and
　a processor for controlling said display means;
　wherein the processor is configured to:
　　in dependence on object data relating to an identified object representing a potential hazard, determine an angular position of the identified object relative to the vehicle;
　　generate a control signal to cause the display means to display a visual indicator at a display position in said display means corresponding to the determined relative angular position of the identified object; and
　　modify the control signal to progressively change the display position of the visual indicator within the display means at least substantially to match changes in the relative angular position of the identified object.

The vehicle interface device can also be suitable for generating an audible indication of a potential hazard, the vehicle interface device comprising:
　at least one electroacoustic transducer configured to generate an audible signal; and
　a processor for controlling said at least one electroacoustic transducer;
　wherein the processor is configured to:
　　in dependence on object data relating to an identified object representing a potential hazard, determine an angular position of the object relative to the vehicle;
　　generate a control signal to cause the at least one electroacoustic transducer to generate an audio object; and
　　modify the control signal to progressively change a perceived spatial location of the audio object to represent changes in the relative angular position of the identified object.

The vehicle interface device can be configured to control generation of the visual indication and/or the audio indication and/or the haptic indication of a potential hazard. The one or more indications can be user-selectable. The one or more indications can be controlled in dependence on user preferences, for example.

According to a further aspect of the present invention there is provided a vehicle comprising a vehicle interface device as described herein.

According to a still further aspect of the present invention there is provided a method of generating a haptic indication of a potential hazard, the method comprising:
  in dependence on object data relating to an identified object representing a potential hazard, determining an angular position of the identified object relative to the vehicle;
  generating a haptic signal for providing an indication of the determined relative position of the identified object; and
  progressively changing the generated haptic signal to represent changes in the relative angular position of the identified object.

The method can comprise receiving said object data from sensor means disposed on the vehicle.

The method can comprise controlling activation of a plurality of said haptic generators to represent changes in the relative angular position to the identified object from the vehicle.

The at least one haptic generator can comprise a vibration generator.

Alternatively, the at least one haptic generator can comprise an ultrasonic transducer for generating an ultrasonic signal. The ultrasonic transducer can be configured to control the output direction of said ultrasonic signal to represent changes in the relative angular position to the identified object from the vehicle.

The at least one haptic generator comprises an air vent for generating the haptic signal in the form of a jet of air. The air vent can comprise an adjustable nozzle for controlling the direction of the jet of air to represent changes in the relative angular position to the identified object from the vehicle.

The at least one haptic generator can be disposed within a seat in the occupant compartment. The method can comprise determining occupant contact with the seat. The activation of said at least one haptic generator can be controlled in dependence on the determined occupant contact with the seat.

The method can comprise determining a trajectory of the identified object in dependence on the identified object data. The haptic signal can be modified in dependence on the determined trajectory.

The method can comprise determining a time to collision in dependence on the identified object data. The haptic signal can be modified in dependence on the determined time to collision.

The method can comprise determining a nature of the identified object in dependence on the identified object data. The haptic signal can be modified in dependence on the determined nature.

The method can comprise modifying the haptic signal by changing one or more of the following parameters: amplitude, frequency, magnitude, haptic pattern; and pattern form.

The method can comprise generating a visual indication of a potential hazard, the method comprising:
  in dependence on object data relating to an identified object representing a potential hazard, determining an angular position of the identified object relative to a vehicle;
  displaying a visual indicator at a display position corresponding to the determined relative angular position of the identified object; and
  progressively changing the display position of the visual indicator at least substantially to match changes in the relative angular position of the identified object.

The method can comprise generating an audible indication of a potential hazard, the method comprising:
  in dependence on object data relating to an identified object representing a potential hazard, determining an angular position of the object relative to a vehicle;
  generating an audible signal for providing an indication of the determined relative angular position of the object; and
  progressively modifying the generated audible signal to represent changes in the relative angular position of the identified object.

The method can comprise controlling generation of the visual indication and/or the audio indication and/or the haptic indication of a potential hazard. The one or more indications can be user-selectable. The one or more indications can be controlled in dependence on user preferences, for example.

Aspects of the present invention further relate to a vehicle interface device for generating a visual indication of a potential hazard; to a vehicle comprising a visual vehicle interface device; and to a method of generating a visual indication of a potential hazard.

According to a further aspect of the present invention there is provided an automotive vehicle interface device for generating a visual indication of a potential hazard, the vehicle interface device comprising:
  a display means configured to extend around at least a portion of a perimeter of an occupant compartment in a vehicle; and
  a processor for controlling said display means;
  wherein the processor is configured to:
    in dependence on object data relating to an identified object representing a potential hazard, determine an angular position of the identified object relative to the vehicle;
    generate a control signal to cause the display means to display a visual indicator at a display position in said display means corresponding to the determined relative angular position of the identified object; and
    modify the control signal to progressively change the display position of the visual indicator within the display means at least substantially to match changes in the relative angular position of the identified object.

The vehicle interface device displays the visual indicator to notify the vehicle driver of an identified object which represents a potential hazard. At least in certain embodiments, the display position of the visual indicator may be modified to provide a substantially continuous spatial representation of the relative angular position of the identified object. Changes in the relative angular position of the identified object are represented by the progressive changes in the display position of the visual indicator. Changes in the relative angular position may be represented by a spatially uninterrupted, continuous movement of the visual indicator. The uninterrupted movement of the visual indicator within the display means provides a continuous representation of changes in the angular position of the identified object relative to the vehicle. The visual indicator provides an indication of a relative direction to the identified object. The uninterrupted movement of the visual indicator may facilitate identification and assessment of any hazard posed by the identified object.

The processor may be configured to change the display position of the visual indicator such that a determined change in the relative angular position of the identified object results in an equivalent angular change in the display position of the visual indicator. At least in certain embodiments, relatively small changes in the relative angular position may be represented by the progressive change to the display position of the visual indicator. By way of example, a change of less than or equal to 1°, 3°, 5° or 10° in the relative angular position of the display means may be represented by a corresponding change in the display position of the visual indicator. The change in the display position is typically dependent on a resolution of the display means.

The vehicle interface device may provide an awareness of a potential hazard in terms of one or more of the following: position, trajectory, nature, criticality, etc. The alert(s) generated by the vehicle interface device may convey information, for example using one or more of the following strategies: colour and/or pulses to represent criticality of the potential hazard; position (i.e. the angular position of the potential hazard in relation to the vehicle); motion (trajectory of the potential hazard and/or changes in the relative angular position of the identified object); form; and dimensions. At least in certain embodiments, these strategies may provide an intuitive interface capable of providing improved awareness of a potential hazard in order to facilitate prevention of an accident.

The identified object data may define the position of the identified object. The position of the identified object may be defined using a coordinate system, for example defined in relation to a virtual reference point. The speed and/or acceleration of the identified object may be determined by monitoring changes in the position of the identified object with respect to time, or the rate of change of the position of the identified object. The processor may be configured to determine the absolute speed and/or acceleration of the identified object (using the vehicle speed and/or direction of travel); or may be configured to determine the relative speed and/or acceleration of the identified object.

The display position of the visual indicator in said display means corresponds to the relative angular position of the identified object to a reference axis, typically a longitudinal axis of the vehicle. It will be understood that the relative angular position may be positive or negative relative to said reference axis. The display position of the visual indicator within the display means may indicate an angular position (heading) of the identified object relative to a longitudinal axis of the vehicle. The display position of the visual indicator within the display means may correspond to an angular position of the identified object relative to the vehicle. Thus, the visual indicator may be displayed at an angular position offset from a longitudinal axis of the vehicle which at least substantially matches the angular position of the identified object relative to the vehicle.

The visual indicator is a graphical element displayed on the display means. The visual indicator may take the form of a localised indicator to convey more accurate directional information to an occupant of the vehicle. The processor may be configured to receive said object data from sensor means disposed on the vehicle.

The processor may be configured to receive said object data from sensor means disposed on the vehicle. The sensor means may be configured to monitor a region external to the vehicle to identify the identified object. The sensor means may comprise one or more of the following set: one or more ultrasonic sensors; one or more capacitive sensors; one or more optical sensors; and one or more radar sensors. The sensor means may, for example, form part of an advanced driver aid system (ADAS). By way of example, ADAS may comprise one or more of the following: a camera (surround view, lane departure warning, park assistance); stereo camera (pedestrian detection); long-range radar (Adaptive Cruise Control); short/medium-range radar (blind spot detection).

At least in certain embodiments, the display means operatively extends around at least a portion of the perimeter of the occupant compartment. In use, the display position of the visual indicator in relation to an occupant corresponds to the relative position of the identified object to that occupant. The display means may be in the form of one or more display devices. The one or more display devices may be configured for mounting within the occupant compartment of the vehicle. A first display device may extend transversely across a front of the occupant compartment; and/or a second display device may extend transversely across a rear of the occupant compartment. A third display device may extend longitudinally along a first side of the occupant compartment; and/or a fourth display device may extend longitudinally along a second side of the occupant compartment.

The sensor means may comprise at least a first sensor for monitoring a first operating region; and the display means may comprise at least a first sub-portion associated with the first operating region. The processor may be configured to modify the control signal to change the display position of the visual indicator within said first sub-portion of the display means to represent changes in the determined relative angular position of the identified object within said first operating region. The first sub-portion of the display means may extend in a transverse direction across the occupant compartment. The first operating region may be disposed in front of the vehicle and the first sub-portion of the display means may extend across the front of the occupant compartment. Alternatively, the first operating region may be disposed behind the vehicle and the first sub-portion of the display means may extend across the rear of the occupant compartment. The first sub-portion of the display means may be configured to extend in a transverse direction across the occupant compartment; and the first operating region is operatively disposed in front of or behind the vehicle.

The sensor means may comprise at least a second sensor for monitoring a second operating region; and the display means may comprise at least a second sub-portion associated with the second operating region. The processor may be configured to modify the control signal to change the display position of the visual indicator within said second sub-portion of the display means to represent changes in the determined relative angular position of the identified object within said second operating region. The second sub-portion of the display means may extend in a longitudinal direction along a first side of the occupant compartment and the second operating region may be disposed on said first side of the vehicle. A corresponding arrangement may be provided on the other side of the vehicle. The second sub-portion of the display means may be configured to extend in a longitudinal direction along a first side of the occupant compartment; and the second operating region may be operatively disposed on said first side of the vehicle.

Alternatively, or in addition, the vehicle may comprise a receiver for receiving the identified object data. The receiver may be a wireless receiver for receiving a wireless transmission, for example a radio frequency (RF) transmission. The identified object data may be transmitted from another vehicle as part of a vehicle-to-vehicle (V2V) communication; or from infrastructure as part of an infrastructure-to-vehicle (12V) communication. The identified object data could be transmitted from another vehicle to indicate the position of that vehicle or the position of another vehicle. The identified object data could be transmitted by the infrastructure to indicate the position and/or movements of one or more other vehicles in the vicinity of the vehicle.

The processor may be configured to determine a position of the identified object in dependence on the identified object data. The processor may modify the appearance of the visual indicator in dependence on the determined position of the identified object.

The processor may be configured to determine a trajectory of the identified object in dependence on the identified object data. The processor may modify the appearance of the visual indicator in dependence on the determined trajectory.

The processor may be configured to determine a time to collision in dependence on the identified object data. The processor may modify the appearance of the visual indicator in dependence on the determined time to collision.

The processor may be configured to determine a nature of the identified object in dependence on the identified object data. The processor may modify the appearance of the visual indicator in dependence on the determined nature of the identified object. The nature of the identified object could be determined by analysing a signal output from the sensor means. The nature of the identified object could, for example, be determined by applying an image processing algorithm to image data generated by an imaging sensor (optical imaging and/or thermal imaging). Alternatively, or in addition, the nature of the identified object could be determined by analysing a reflected signal received by a radar sensor or an ultrasonic sensor.

The processor may be configured to determine a speed of the identified object in dependence on the identified object data. The processor may modify the appearance of the visual indicator in dependence on the determined speed of the identified object.

The processor may be configured to determine a hazard level (criticality) in dependence on the identified object data. The processor may be configured to modify the appearance of the visual indicator in dependence on the determined hazard level.

The processor may be configured to determine a point of impact where the identified object would collide with the vehicle in dependence on the identified object data. The point of impact may, for example, be determined in dependence on the path of the vehicle and the determined trajectory of the identified object. The processor may be configured to modify the appearance of the visual indicator in dependence on the point of impact, for example to provide a visual indication of the location of the determined point of impact.

The processor may be configured to modify the appearance of the visual indicator by changing one or more of the following parameters: colour; size; shape; pattern; and pattern form. The processor may modify the control signal to change said one or more parameters.

The processor may be configured to change the display position of the visual indicator in dependence on a determined speed of the vehicle. The vehicle interface device may comprise means for monitoring a driver of the vehicle and generating driver data; wherein the processor is configured to change the display position of the visual indicator in dependence on the driver data.

The processor may be configured to determine a rate of change of the relative angular position of the identified object in dependence on the identified object data. The processor may modify the appearance of the visual indicator in dependence on the determined rate of change.

The processor may be configured to determine a direction of movement of the identified object relative to the vehicle and/or a rate of change of the relative angular position. The processor may be configured to modify the control signal to provide a visual representation of a direction of movement of the identified object relative to the vehicle and/or the determined rate of change of the relative angular position. The display means may be configured to display an elongated visual element, for example in the form of a tail, associated with the visual indicator to indicate the direction of travel of the identified object and/or the rate of change of the relative angular position. For example, the elongated visual element may extend from the visual indicator in a direction corresponding to the direction from which the identified object is travelling. The length and/or thickness and/or colour of the tail may indicate the speed of the identified object or the rate of change of the relative angular position. One or more ghost images may be displayed offset from the visual indicator in a direction corresponding to the direction from which the identified object has travelled. The offset of said one or more ghost images may be correlated to the speed of the identified object relative to the vehicle. A plurality of said ghost images may be displayed to form the aforementioned elongated visual element. The ghost image(s) may be displayed at a lower illumination level than the visual indicator and/or in a different colour from the visual indicator. The illumination level of the ghost image(s) may decrease with time to indicate movement.

The processor may modify the control signal to change the display position of the visual indicator and/or to activate a different portion of the display means in dependence on the vehicle speed. As the vehicle speed increases, the field of view of the driver tends to narrow. By changing the display position of the visual indicator in dependence on the vehicle speed, the visual indication may remain in the field of view of the driver (for example in their peripheral vision) as the vehicle speed increases. An offset may be applied to the display position of the visual indicator in dependence on the speed of the vehicle.

The processor may be configured to receive driver status data. For example, the processor may be coupled to means for monitoring a driver of the vehicle. The processor may be configured to change the display position of the visual indicator in dependence on the driver status data. For example, the display position of the visual indicator may be adjusted depending on a determined gaze direction of the driver and/or head pose of the driver.

The vehicle interface device may also be suitable for generating an audible indication of a potential hazard, the vehicle interface device comprising:
  at least one electroacoustic transducer configured to generate an audible signal; and
  a processor for controlling said at least one electroacoustic transducer;
  wherein the processor is configured to:
    in dependence on object data relating to an identified object representing a potential hazard, determine an angular position of the object relative to the vehicle;

generate a control signal to cause the at least one electroacoustic transducer to generate an audio object; and
modify the control signal to progressively change a perceived spatial location of the audio object to represent changes in the relative angular position of the identified object.

The vehicle interface device may also be suitable for generating a haptic indication of a potential hazard, the vehicle interface device comprising:
at least one haptic generator configured to generate a haptic signal; and
a processor for controlling said haptic generator;
wherein the processor is configured to:
in dependence on object data relating to an identified object representing a potential hazard, determine an angular position of the object relative to the vehicle;
generate a control signal to cause the haptic generator to output a haptic signal for providing an indication of the determined relative position of the object; and
modify the control signal to progressively change the generated haptic signal to represent changes in the relative angular position of the identified object.

The vehicle interface device may be configured to control generation of the visual indication and/or the audio indication and/or the haptic indication of a potential hazard. The one or more indications may be user-selectable. The one or more indications may be controlled in dependence on user preferences, for example.

According to a further aspect of the present invention there is provided a vehicle comprising a vehicle interface device as described herein.

According to a still further aspect of the present invention there is provided a method of generating a visual indication of a potential hazard, the method comprising:
in dependence on object data relating to an identified object representing a potential hazard, determining an angular position of the identified object relative to the vehicle;
displaying a visual indicator at a display position corresponding to the determined relative angular position of the identified object; and
progressively changing the display position of the visual indicator at least substantially to match changes in the relative angular position of the identified object.

The method may comprise receiving said object data from sensor means disposed on the vehicle.

The sensor means may comprise at least a first sensor for monitoring a first operating region. The display means may comprise at least a first sub-portion associated with the first operating region. The method may comprise modifying the control signal to change the display position of the visual indicator within said first sub-portion of the display means to represent changes in the determined relative angular position of the identified object within said first operating region.

The first sub-portion of the display means may be configured to extend in a transverse direction across the occupant compartment. The first operating region may be operatively disposed in front of or behind the vehicle.

The sensor means may comprise at least a second sensor for monitoring a second operating region. The display means may comprise at least a second sub-portion associated with the second operating region. The method may comprise modifying the control signal to change the display position of the visual indicator within said second sub-portion of the display means to represent changes in the determined relative angular position of the identified object within said second operating region.

The second sub-portion of the display means may be configured to extend in a longitudinal direction along a first side of the occupant compartment. The second operating region may be operatively disposed on said first side of the vehicle.

The method may comprise determining a position of the identified object in dependence on the identified object data; and modifying the appearance of the visual indicator in dependence on the determined position of the identified object.

The method may comprise determining a trajectory of the identified object in dependence on the identified object data; and modifying the appearance of the visual indicator in dependence on the determined trajectory.

The method may comprise determining a time to collision in dependence on the identified object data; and modifying the appearance of the visual indicator in dependence on the determined time to collision.

The method may comprise determining a nature of the identified object in dependence on the identified object data; and modifying the appearance of the visual indicator in dependence on the determined nature of the identified object.

The method may comprise determining a speed of the identified object in dependence on the identified object data; and modifying the appearance of the visual indicator in dependence on the determined speed of the identified object.

The method may comprise modifying the appearance of the visual indicator by changing one or more of the following parameters: colour; size; shape; pattern; and pattern form.

The method may comprise changing the display position of the visual indicator in dependence on a determined speed of the vehicle.

The method may comprise monitoring a driver of the vehicle and generating driver data; wherein the method comprises changing the display position of the visual indicator in dependence on the driver data.

The method may comprise generating an audible indication of a potential hazard, the method comprising:
in dependence on object data relating to an identified object representing a potential hazard, determining an angular position of the object relative to a vehicle;
generating an audible signal for providing an indication of the determined relative angular position of the object; and
progressively modifying the generated audible signal to represent changes in the relative angular position of the identified object.

The method may comprise generating a haptic indication of a potential hazard, the method comprising:
in dependence on object data relating to an identified object representing a potential hazard, determining an angular position of the object relative to a vehicle;
generating a haptic signal for providing an indication of the determined relative position of the object; and
progressively changing the generated haptic signal to represent changes in the relative angular position of the identified object.

The method may comprise controlling generation of the visual indication and/or the audio indication and/or the haptic indication of a potential hazard. The one or more indications may be user-selectable. The one or more indications may be controlled in dependence on user preferences, for example.

Aspects of the present invention further relate to a vehicle interface device for generating an audible indication of a potential hazard; to a vehicle comprising an audible vehicle interface device; and to a method of generating an audible indication of a potential hazard.

According to a further aspect of the present invention there is provided a vehicle interface device for generating an audible indication of a potential hazard, the vehicle interface device comprising:
  a plurality of electroacoustic transducers for generating an audio object; and
  a processor for controlling said electroacoustic transducers;
  wherein the processor is configured to:
    in dependence on object data relating to an identified object representing a potential hazard, determine an angular position of the identified object relative to the vehicle;
    generate a control signal to cause the electroacoustic transducers to generate an audio object; and
    modify the control signal to progressively change a perceived spatial location of the audio object to represent changes in the determined relative angular position of the identified object.

The vehicle interface device outputs the audio object to alert the vehicle driver of an identified object which represents a potential hazard. By progressively changing the audio object, the vehicle interface may provide a substantially continuous (i.e. substantially uninterrupted) indication of the angular position of the identified object in relation to the vehicle. The audio object may be controlled to mirror changes in the determined position of the identified object in relation to the vehicle. The perceived spatial location of the audio object may be changed progressively to track the determined angular position of the identified object. The vehicle interface may, at least in certain embodiments, facilitate identification and assessment of the hazard posed by the identified object. The location of the audio object, as perceived by a vehicle occupant (for example the driver of the vehicle), is referred to herein as the perceived spatial location of the audio object.

The vehicle interface device may comprise means for monitoring a driver of the vehicle and generating driver data; wherein the processor is configured to change the perceived spatial position of the audio object in dependence on the driver data.

The vehicle interface device may provide an awareness of a potential hazard in terms of one or more of the following: position, trajectory, nature, criticality, etc. The audio object generated by the vehicle interface device may convey information, for example using one or more of the following strategies: frequency and/or volume to represent criticality of the potential hazard; position (i.e. the location of the potential hazard); motion (trajectory of the potential hazard); and controlling the acoustic signature to indicate the nature of the identified object. At least in certain embodiments, these strategies may provide an intuitive interface capable of providing improved awareness of a potential hazard in order to facilitate prevention of an accident.

The audio object may represent the position of the identified object in relation to the vehicle. The position of the identified object may be defined using a coordinate system, for example defined in relation to a virtual reference point. The speed and/or acceleration of the identified object may be determined by monitoring changes in the position of the identified object with respect to time, or the rate of change of the position of the identified object. The processor may be configured to determine the absolute speed and/or acceleration of the identified object (using the vehicle speed and/or direction of travel); or may be configured to determine the relative speed and/or acceleration of the identified object.

The object data may comprise position data indicating the position of the object relative to the vehicle; and/or identification data indicating the nature (i.e. type or classification) of the object. The processor may be configured to receive said object data from sensor means. The vehicle interface device may be disposed in a vehicle and the sensor means may be provided on said vehicle. The sensor means may be configured to monitor a region external to the vehicle to identify the identified object. The sensor means may comprise one or more of the following set: one or more ultrasonic sensors; one or more capacitive sensors; one or more optical sensors; and one or more radar sensors. The sensor means may, for example, form part of an advanced driver aid system (ADAS). By way of example, ADAS may comprise one or more of the following: a camera (surround view, lane departure warning, park assistance); stereo camera (pedestrian detection); long-range radar (Adaptive Cruise Control); short/medium-range radar (blind spot detection).

Alternatively, or in addition, the vehicle may comprise a receiver for receiving the object data. The receiver may be a wireless receiver for receiving a wireless transmission, for example a radio frequency (RF) transmission. The object data may be transmitted from another vehicle as part of a vehicle-to-vehicle (V2V) communication; or from infrastructure as part of an infrastructure-to-vehicle (I2V) communication. The object data could be transmitted from another vehicle to indicate the position of that vehicle or the position of another vehicle. The object data could be transmitted by the infrastructure to indicate the position and/or movements of one or more other vehicles in the vicinity of the vehicle.

The audio object is formed from a plurality of mechanical waves having an audible frequency. The electroacoustic transducers may be a set of loudspeakers disposed in the occupant compartment, for example forming part of an audio entertainment system in the vehicle.

The audio object is defined spatially within an audio scene (also referred to as a spatial audio object). The audio scene may, for example, correspond to an occupant compartment of a vehicle. The spatial position of the audio object may, for example, be defined in two dimensions (X and Y coordinates, for example corresponding to a longitudinal axis and a transverse axis of a vehicle), or in three dimensions (X, Y and Z coordinates, for example corresponding to a longitudinal axis, a transverse axis and a vertical axis of a vehicle). The audio object may provide an audible indication to an occupant of the vehicle of the relative angular position of the identified object. The processor may be in the form of an audio renderer. The spatial position of the audio object may be controlled to indicate the determined relative angular position of the identified object. The processor may be configured to progressively change the spatial location of the audio object to represent changes in the determined relative angular position of the identified object. By varying the location of the audio object within the occupant compartment, the perceived source of the alert changes. In use, the electroacoustic transducers may generate a multi-dimensional audio object within an occupant compartment of a vehicle.

The processor may be configured to determine a trajectory of the identified object in dependence on the object data. The processor may be configured to modify the audio object in dependence on the determined trajectory. The spatial location of the audio object could be modified to travel along a virtual trajectory which at least substantially matches the determined trajectory of the identified object.

The processor may be configured to determine a time to collision in dependence on the object data. The processor may be configured to modify the audio object in dependence on the determined time to collision. For example, the frequency and/or volume of an audio object may be altered in dependence on the determined time to collision.

The processor may be configured to determine a nature of the identified object in dependence on the object data. The processor may be configured to modify the audio object in dependence on the determined nature of the identified object. For example, the acoustic signature (or pattern) could be modified in dependence on the determined nature of the identified object. A first acoustic signature may be output if the identified object is identified as another vehicle. The first acoustic signature may, for example, be the sound of a vehicle horn. A second acoustic signature may be output if the identified object is identified as a cyclist. The second acoustic signature may, for example, be the sound of a bicycle bell. A third acoustic signature may be output if the identified object is identified as a pedestrian. The third acoustic signature may, for example, be the sound of voices. A fourth acoustic signature may be output if the identified object is identified as an animal. The fourth acoustic signature may, for example, be the sound of a dog barking.

The processor may be configured to determine a speed of the identified object in dependence on the object data. The processor may modify the audio object in dependence on the determined speed of the identified object.

The processor may be configured to determine a hazard level (criticality) in dependence on the object data. The processor may be configured to modify the audio object in dependence on the determined hazard level.

The processor may be configured to modify the audio object by changing one or more of the following parameters: amplitude, frequency, volume, acoustic pattern, signature, and pattern form. The processor may be configured to modify the audio object to alter the perceived loudness of the audio object.

The processor may be configured to receive driver status data. The driver status data may, for example, be generated by driver monitoring means, for example to determine gaze direction and/or head pose. The driver monitoring means may, for example, be in the form of an optical camera coupled to an image processing unit. The processor may be configured to change the audio object in dependence on the gaze direction and/or head pose of the driver. For example, the spatial position of the audio object could be varied in dependence on the gaze direction and/or head pose of the driver.

The vehicle interface device may also be suitable for generating a visual indication of a potential hazard, the vehicle interface device comprising:
 a display configured to extend around at least a portion of a perimeter of an occupant compartment in a vehicle; and
 a processor for controlling said display;
 wherein the processor is configured to:
  in dependence on object data relating to an identified object representing a potential hazard, determine an angular position of the identified object relative to the vehicle;
  generate a control signal to cause the display to display a visual indicator at a display position in said display corresponding to the determined relative angular position of the identified object; and
  modify the control signal to progressively change the display position of the visual indicator within the display at least substantially to match changes in the relative angular position of the identified object.

The vehicle interface device may also be suitable for generating a haptic indication of a potential hazard, the vehicle interface device comprising:
 at least one haptic generator configured to generate a haptic signal; and
 a processor for controlling said haptic generator;
 wherein the processor is configured to:
  in dependence on object data relating to an identified object representing a potential hazard, determine an angular position of the object relative to the vehicle;
  generate a control signal to cause the haptic generator to output a haptic signal for providing an indication of the determined relative position of the object; and
  modify the control signal to progressively change the generated haptic signal to represent changes in the relative angular position of the identified object.

According to a further aspect of the present invention there is provided a vehicle comprising a vehicle interface device as described herein.

According to a further aspect of the present invention there is provided a method of generating an audible indication of a potential hazard, the method comprising:
 determining an angular position of an identified object relative to a vehicle;
 generating an audio object for providing an indication of the determined relative angular position of the identified object; and
 progressively changing a perceived spatial location of the audio object to represent changes in the determined relative angular position of the identified object.

The angular position of the identified object may be determined in dependence on object data received from sensor means.

The perceived spatial location of the audio object may be changed progressively to track the determined angular position of the identified object.

The method may comprise monitoring a driver of the vehicle to generate driver data. The perceived spatial position of the audio object may be changed in dependence on the driver data.

The method may comprise determining a trajectory of the identified object; and modifying the audio object in dependence on the determined trajectory.

The method may comprise determining a time to collision. The audio object may be modified in dependence on the determined time to collision.

The method may comprise determining a nature of the identified object. The audio object may be modified in dependence on the determined nature of the identified object.

The audio object may be modified by changing one or more of the following parameters: amplitude, frequency, volume, acoustic pattern, signature, and pattern form.

The method may comprise generating a visual indication of a potential hazard, the method comprising:

displaying a visual indicator at a display position corresponding to the determined relative angular position of the identified object; and progressively changing the display position of the visual indicator at least substantially to match changes in the relative angular position of the identified object.

The method may comprise generating a haptic indication of a potential hazard, the method comprising:

generating a haptic signal for providing an indication of the determined relative position of the object; and progressively changing the generated haptic signal to represent changes in the relative angular position of the identified object.

The term processor is used herein to refer to one or more electronic processors. Similarly, the term system memory is used herein to refer to one or more storage devices. The processor can be a general purpose computational device configured to execute a set of software instructions to perform the method(s) described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

An embodiment of the present invention will now be described, by way of example only, with reference to the accompanying figures, in which:

FIG. 5 illustrates operation of the display device shown in FIG. 4;

FIGS. 7A and 7B illustrate operation of the display device of the vehicle interface device;

FIG. 10 shows a vehicle seat incorporating a haptic device in accordance with an embodiment of the present invention;

FIGS. 11A-C show the contact patch on the vehicle seat shown in FIG. 10 based on percentile weight measurements;

FIGS. 12A-C illustrates the operation of the vehicle interface device in a first operating scenario;

FIGS. 13A-C illustrates the operation of the vehicle interface device in a second operating scenario;

DETAILED DESCRIPTION

Figure 1:
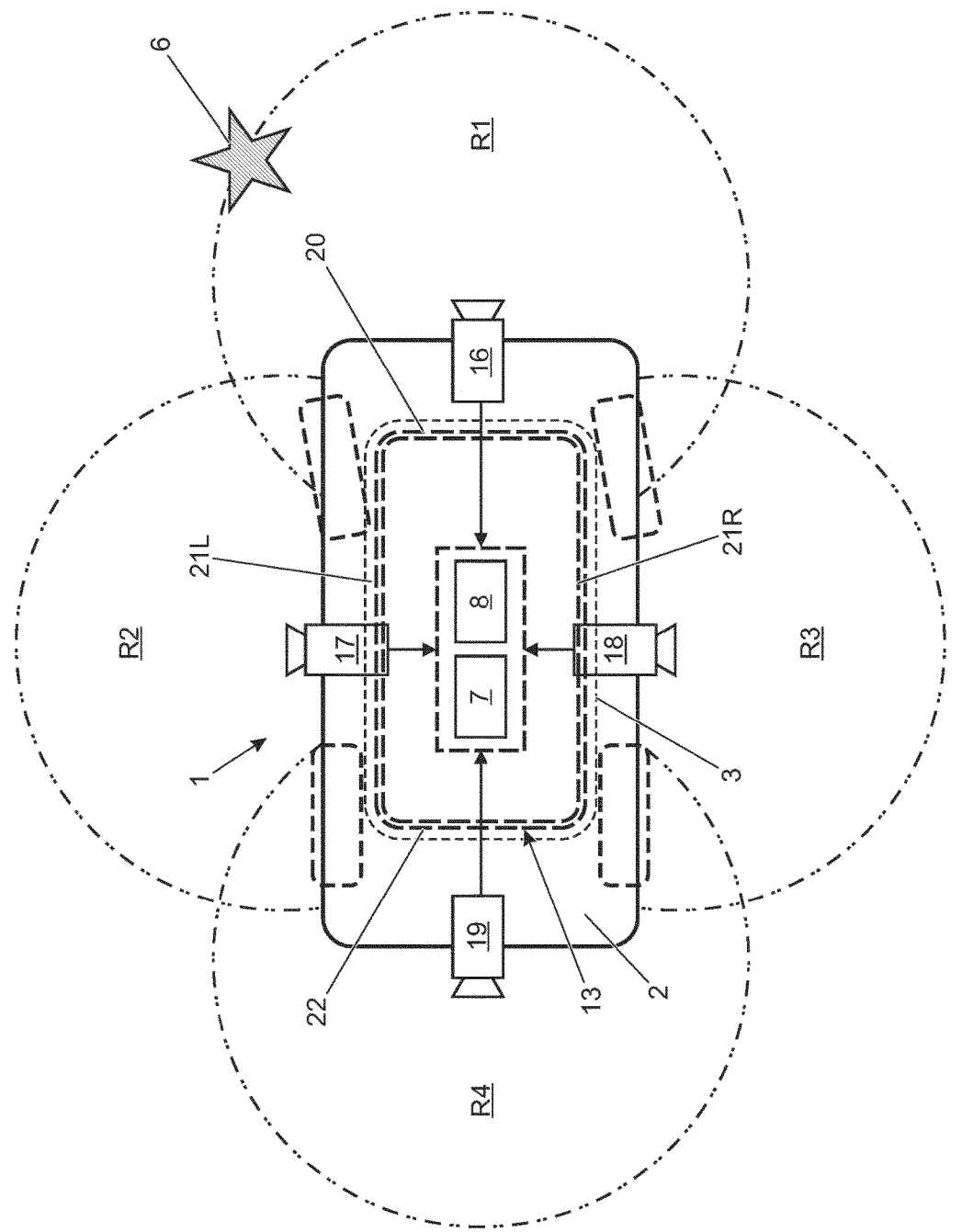
FIG. 1 shows a schematic representation of a vehicle incorporating an interface device in accordance with an embodiment of the present invention.

A vehicle interface device 1 in accordance with an embodiment of the present embodiment will now be described. The vehicle interface device 1 functions as a human machine interface (HMI) for a vehicle 2 shown schematically in FIG. 1. In the present embodiment, the vehicle 2 is an automobile comprising an occupant compartment in the form of a cabin 3 having a front windshield 4, left and right side windows 5L, 5R and a rear windshield (not shown). The vehicle interface device 1 can be implemented in other vehicle types.

The vehicle interface device 1 is operable to generate an alert to notify a driver of the vehicle 2 that a potential hazard has been identified. The alert comprises a directional component to notify the driver of the angular position of the potential hazard in relation to the vehicle 2. The alert in the present embodiment comprises three modalities:

1. Vision—patterns using colours, pulse and motion are displayed in the visual structure of the occupant compartment;
2. Sound—directional object-based sound associated with the nature of the identified object; and
3. Haptic—directional and applied via the seat (or the steering wheel), for example in the form of vibration or contact.

The potential hazard typically takes the form of an object 6 identified by the vehicle interface device 1. The identified object 6 can be either stationary or moving. The vehicle interface device 1 is configured to provide the driver with an indication of the position of the identified object 6 in relation to the vehicle 2. The vehicle interface device 1 can be configured to differentiate between different types of objects to determine the nature of the potential hazard, for example to determine if the potential hazard is a pedestrian (potentially differentiating between an adult and a child), a cyclist, a vehicle, a truck, an animal or an inanimate object. An image processing algorithm can, for example, be applied to image data to determine the nature of the identified object. The form of the alert can be modified in dependence on the determined nature of the potential hazard. The vehicle interface device 1 could identify more than one potential hazard at any time and the techniques described herein could be performed simultaneously for the plurality of identified hazards. Alternatively, the vehicle interface device 1 could be configured to prioritise one of the identified hazards over the others, for example in dependence on the nature of the potential hazards identified by the vehicle interface device 1. The vehicle interface device 1 could be configured to output an alert only relating to the potential hazard identified as having the highest priority.

Figure 2:
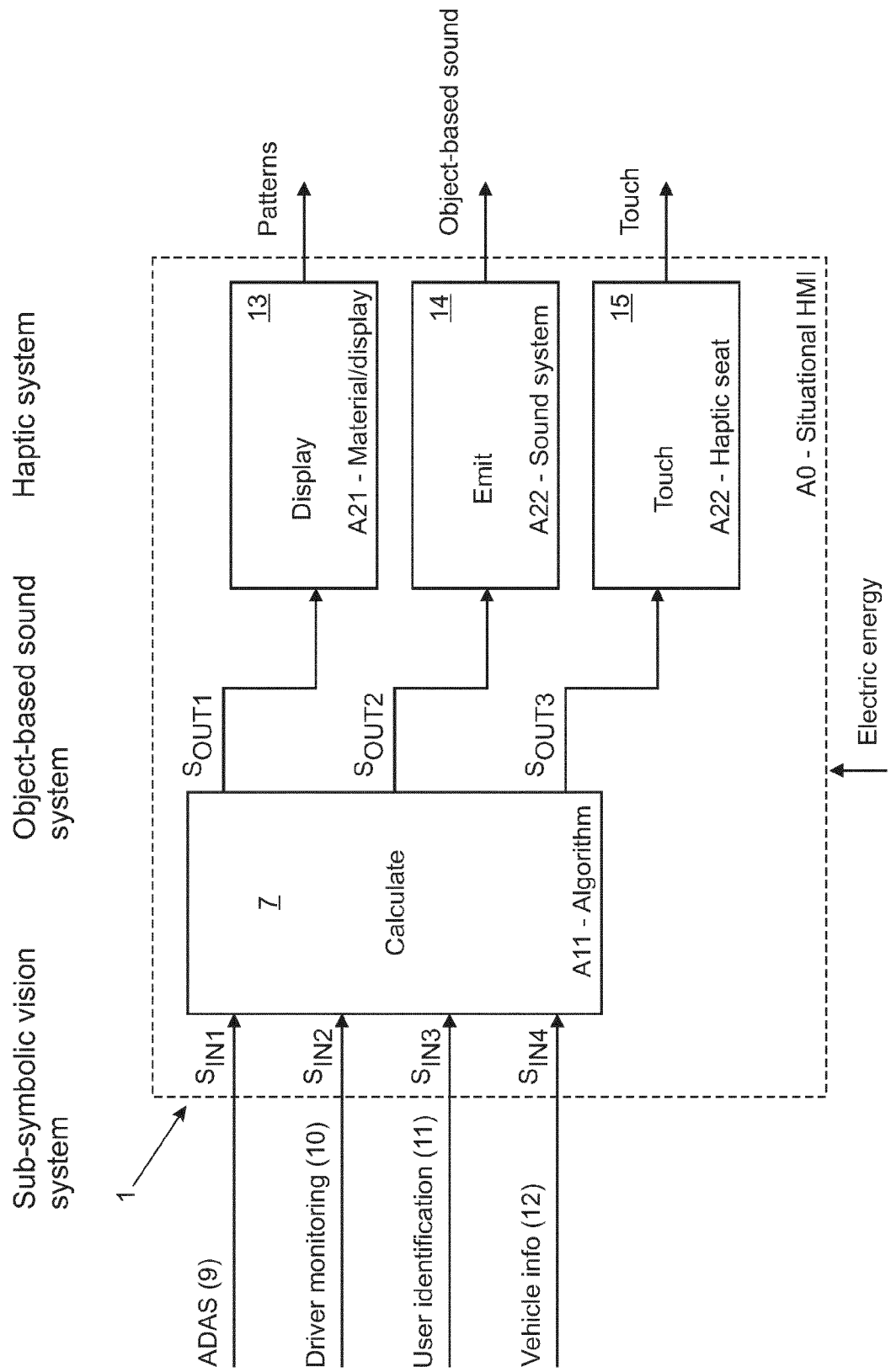
FIG. 2 shows a block diagram providing an overview of the vehicle interface device shown in FIG. 1.

As shown in FIG. 1, the vehicle interface device 1 comprises a processor 7 coupled to system memory 8. The processor 7 is an electronic processor and the system memory 8 comprises an electronic memory device. The processor 7 is configured to execute a set of software instructions held in the system memory 8 to implement a control algorithm in accordance with an aspect of the present invention. The processor 7 is configured to receive signals from a plurality of on-board vehicle systems to identify the identified object 6 and to determine if it represents a potential hazard. The vehicle interface device 1 is shown schematically in FIGS. 2 and 3. The processor 7 receives a first input signal $S_{IN1}$ from an advanced driver aid system (ADAS) 9, a second input signal $S_{IN2}$ from a driver monitoring system 10, a third input signal $S_{IN3}$ from a user identification system 11, and a fourth input signal $S_{IN4}$ from a vehicle information system 12 (for example by accessing data signals published to a communications area (CAN) bus or FlexRay). The processor 7 outputs a first output signal $S_{OUT1}$ to a display device 13; a second output signal $S_{OUT2}$ to an audio device 14; and a third output signal $S_{OUT3}$ to a haptic device 15. The display device 13, the audio device 14 and the haptic device 15 are each operable in dependence on the output signals $S_{OUT1-3}$ to generate the respective visual, audio and haptic alert(s) for the driver of the vehicle 2.

The ADAS 9 is coupled to sensor means for monitoring a region surrounding the vehicle 2. As shown in FIG. 1, the sensor means is configured to monitor a first operating region R1 disposed in front of the vehicle 2; second and third operating regions R2, R3 disposed on the left and right sides of the vehicle 2 respectively; and a fourth operating region R4 disposed behind the vehicle 2. The sensor means is in the form of a forward-facing radar sensor 16, left-facing and right-facing cameras 17, 18, and a rear-facing camera 19. The radar sensor 16 comprises a radio frequency transceiver for transmitting a radio signal and receiving a signal reflected by the identified object 6. The radar sensor 16 outputs reflected signal data for analysis by a first signal processor (typically associated with the radar sensor 16) to identify any objects 6 disposed in the first operating region R1. The radar sensor 16 can be a long-range radar sensor, for example provided as part of an Adaptive Cruise Control (ACC) system; or a short/medium-range radar sensor, for example provided as part of a blind spot detection system. The cameras 17, 18, 19 in the present embodiment are optical cameras which output image data for analysis by a second signal processor (not shown) to identify any objects 6 disposed in the second, third and fourth operating regions R2, R3, R4. The cameras 17, 18, 19 can be provided on the vehicle 2 to implement one or more of the following functions: surround view, lane departure warning and park assistance. One or more of the cameras 17, 18, 19 can be in the form of a stereo camera, for example to detect a pedestrian.

The first and second signal processors identify object(s) 6 proximal to the vehicle 2 within the operating zones R1-4 and output the positional data D1 in the form of x, y coordinates defining the position of the identified object 6 relative to a virtual reference point on the vehicle 2. It will be understood that the sensor means can comprise different types of sensors, such as ultrasonic sensors and/or capacitive sensors. Moreover, the sensor means could be remote from the vehicle 2, for example in another vehicle which is in communication with the vehicle 2 (vehicle-to-vehicle (V2V) communication).

Figure 3:
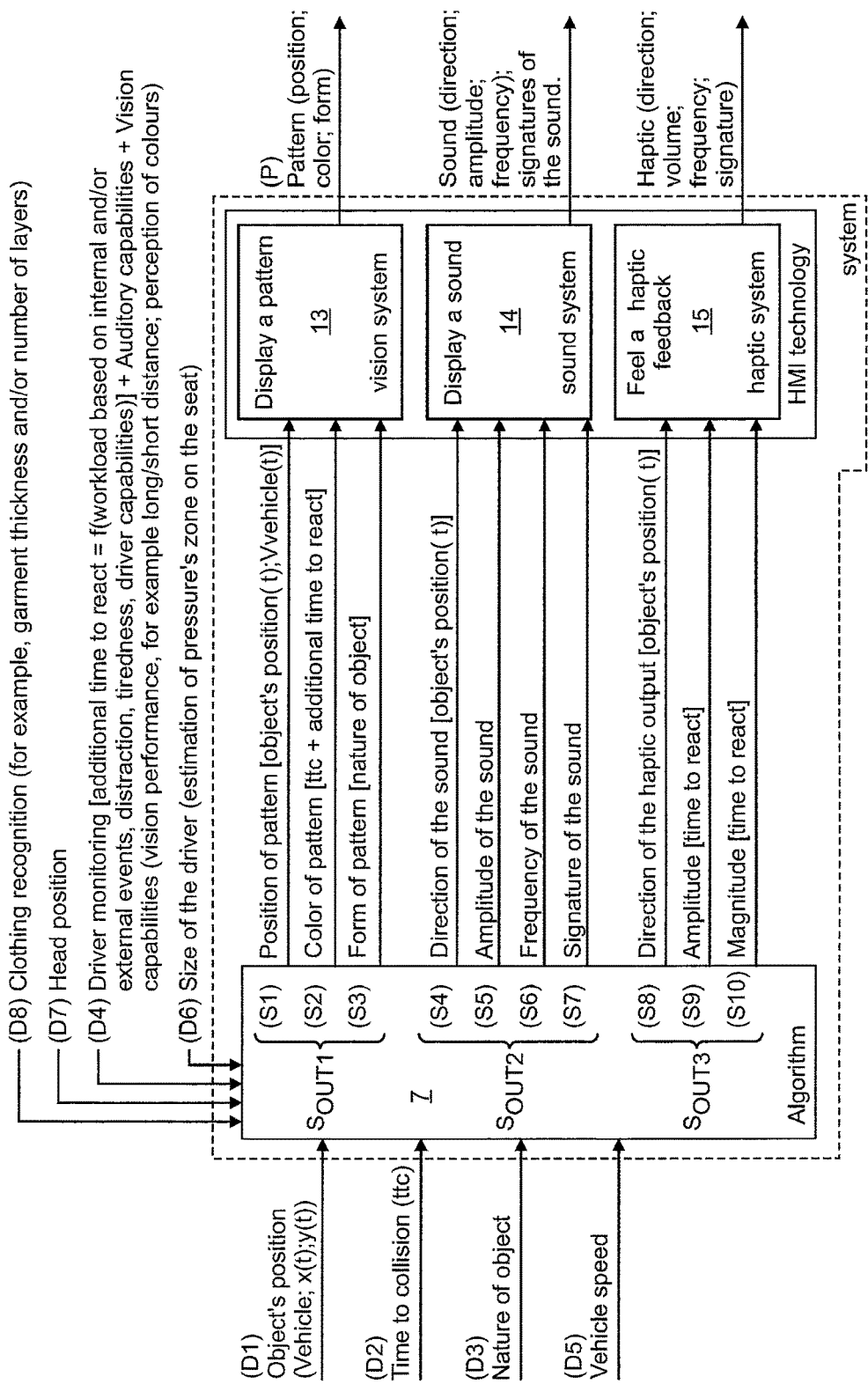
FIG. 3 shows a more detailed representation of the vehicle interface device shown in FIG. 1.

With reference to FIG. 3, the positional data D1 is used to determine an angular position of the identified object 6 in relation to the vehicle 2 (referred to herein as the "relative angular position"). The relative angular position in the present embodiment corresponds to an angle (bearing) measured relative to a longitudinal axis of the vehicle 2. The first and second signal processors also estimate a time to collision (ttc), for example estimated based on the measured position and trajectory of the identified object 6. The first and second signal processors output time to collision data D2 associated with each identified object 6. By comparing the reflected signal data and the image data with referenced files stored in a database in the system memory 8, the first and second signal processors also classify the nature of each object 6 and output nature of object data D3. In the present embodiment, the first and second signal processors are incorporated into the ADAS 9, but they could be implemented as separate processing modules. In respect of each object 6, the ADAS 9 outputs the first input signal $S_{IN1}$ comprising the positional data D1, the time to collision data D2, and the nature of object data D3 to the processor 7.

The positional data D1, the time to collision data D2, and the nature of object data D3 each relate to the identified object 6 identified as a potential hazard. These different data sets are referred to herein as object data. The object data can be output from the sensors means disposed on the vehicle 2. Alternatively, or in addition, the processor 7 could be configured to receive the object data from an external source, such as infrastructure (infrastructure-to-vehicle (I2V)) or another vehicle.

The driver monitoring system 10 comprises a driver monitoring camera (not shown). An image processing unit receives image data from the driver monitoring camera and assesses a driver distraction level and a driver tiredness (fatigue) level. The image processing unit can, for example, implement an image-processing algorithm to determine a driver alertness level, for example based on head pose and/or gaze direction. The driver monitoring system 10 can also monitor the driver workload, for example with reference to the vehicle speed and/or steering angle. A driver capability can also be determined by the driver monitoring system 10 to provide an estimate of an expected reaction time by the driver at any given time. The driver monitoring system 10 monitors the current driver workload, driver distraction, driver tiredness (fatigue) and driver capability. The driver monitoring system 10 can comprise a driver-facing camera to monitor driver behaviour, for example based on face recognition algorithms. The driver monitoring system 10 can also monitor driver inputs, including steering angle and/or pedal angles. The driver monitoring system 10 outputs the second input signal $S_{IN2}$ which includes driver monitoring data D4 comprising an estimated driver reaction time. The driver monitoring system 10 can also output data generated by the image processing unit defining the head pose and/or the gaze direction of the driver. The second input signal $S_{IN2}$ could optionally also comprise information relating to the driver's vision capabilities, for example short or long distance vision and/or colour perception. The driver capability can be determined=T0 (reaction time of a specific situation, for example obtained from a look-up table)+ (delta) ΔT (additional time calculated based on driver monitoring of workload and/or distraction and/or tiredness) or multiply by a predefined percentage of reaction rate (for example, a fatigued individual may take x % longer to react, where x is a predefined number greater than zero). The driver monitoring system 10 can optionally also utilise auditory and/or vision information relating to a particular driver. The auditory information can define a driver's auditory capabilities; and the vision information can define a driver's vision capabilities, for example indicating the driver's long/short sighted ability and/or colour perception ability. The auditory and/or vision information could be measured or could be input by the driver.

The third input signal $S_{IN3}$ can be output from the user identification system 11 to identify the driver of the vehicle.

The processor 7 additionally receives vehicle dynamics data from the vehicle information system 12. The fourth input signal $S_{IN4}$ comprises vehicle speed data D5, but can include other vehicle dynamics parameters, such as the steering angle. The processor 7 can also receive driver data D6 which, as described herein, can be used to estimate one or more physical characteristics of the driver. The processor 7 can also receive driver head position data D7 indicating the position of the driver's head. The processor 7 can also receive driver clothing data D8 characterising the clothing worn by the driver, for example the thickness of a garment and/or the number of layers. The driver head position data D7 and the driver clothing data D8 can be generated in dependence on image processing of image data generated by a driver-facing camera (not shown). The outputs from the display device 13, the audio device 14 and the haptic device 15 can be modified in dependence on the estimated physical characteristics. For example, the haptic output generated by the haptic device 15 can be controlled in dependence on a pressure zone on the driver seat estimated in dependence on the measured weight of the driver.

The processor 7 applies a control algorithm to the input signals $S_{IN1-4}$ to generate the output signals $S_{OUT1-3}$ for controlling operation of the display device 13, the audio device 14 and the haptic device 15 respectively. The processor 7 thereby functions as a HMI controller for the vehicle 2. The configuration of the display device 13, the audio device 14 and the haptic device 15 will now be described in more detail.

Figure 4:
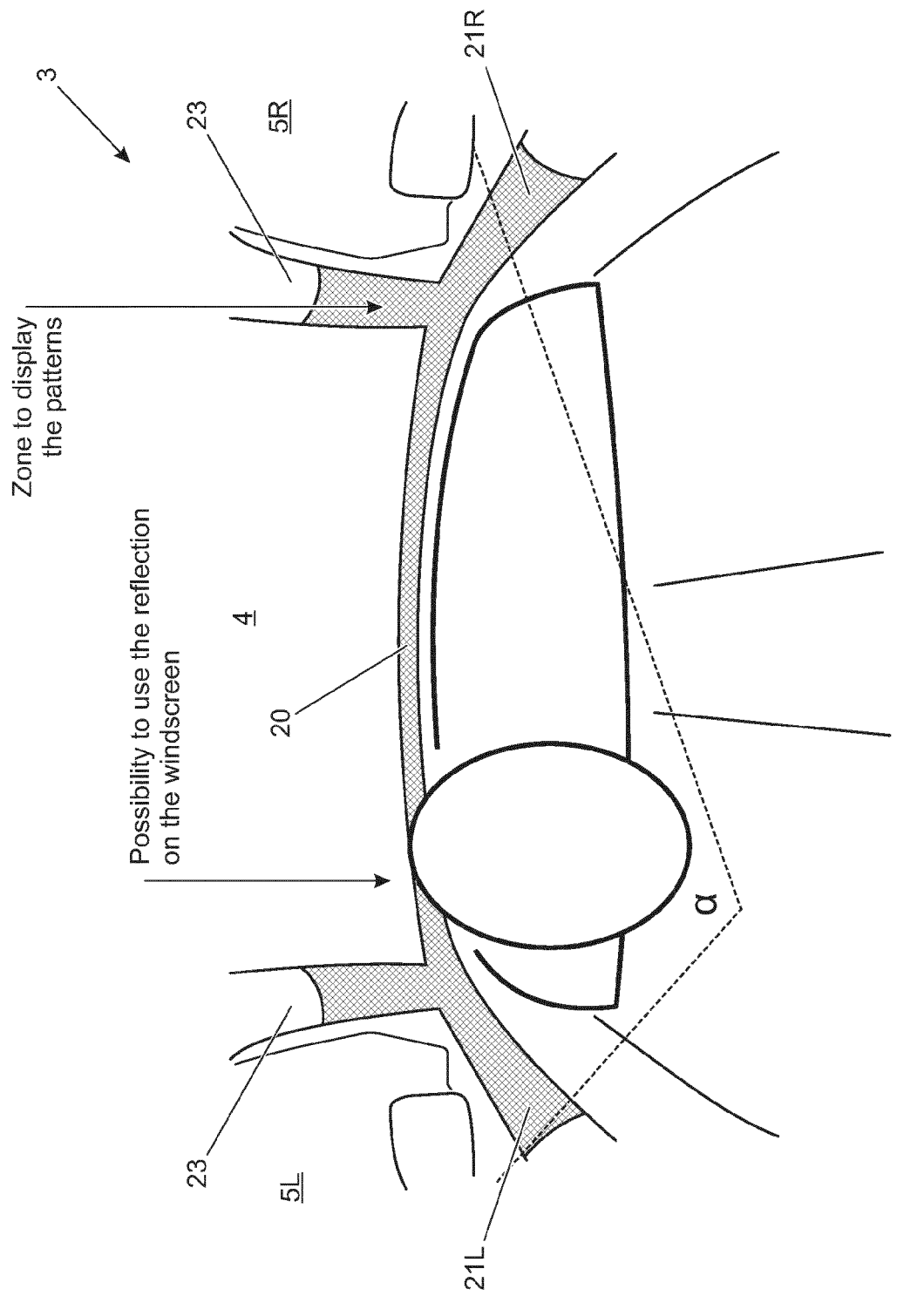
FIG. 4 shows a schematic representation of the display device of the vehicle interface device within the occupant compartment of the vehicle.

The display device 13 is configured to output a visual indicator to notify a vehicle occupant of a potential hazard. The display device 13 is configured to extend substantially around the interior perimeter of the occupant compartment 3. As shown in FIG. 4, the display device 13 comprises a front panel 20, left and right lateral panels 21L, 21R, and a rear panel 22. Thus, the display device 13 provides a 360° visual display extending around the occupant(s) of the vehicle 2. The front panel 20 is disposed adjacent to a base of the front windshield 4, for example across the top of a dashboard; the left and right lateral panels 21L, 21R are disposed adjacent to a base of the respective left and right side windows 5L, 5R; and the rear panel 22 is disposed adjacent to a base of the rear windshield (not shown). In the present embodiment, the display device 13 also extends vertically upwardly along at least a portion of each A-pillar 23. This provides a blind-spot indicator function, as illustrated in FIG. 4. Alternatively, or in addition, the display device 13 can extend vertically upwardly along at least a portion of additional pillars within the vehicle 2, for example the B-pillar and/or the C-pillar and/or the D-pillar.

Figure 6:
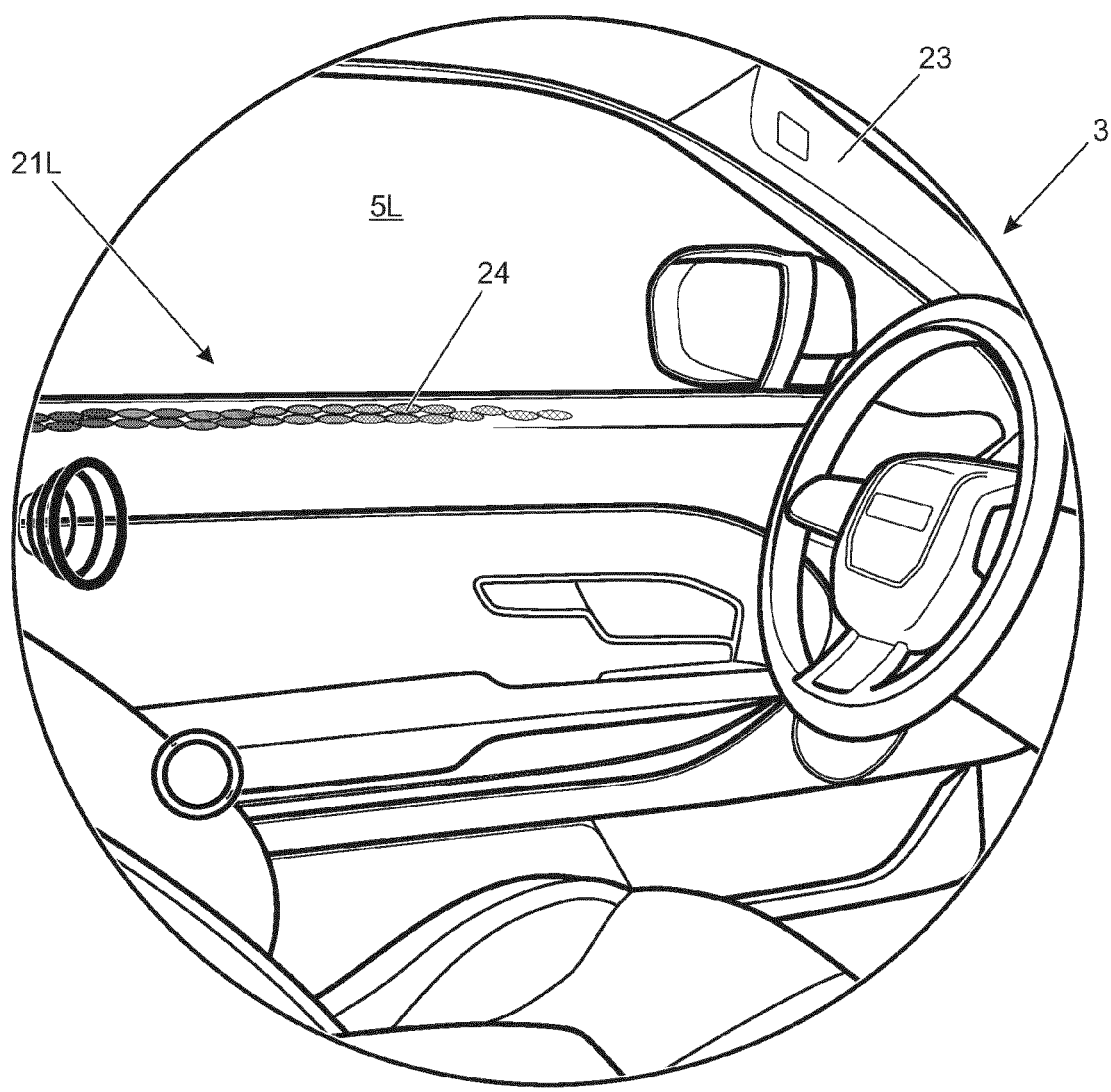
FIG. 6 shows a lateral view of the interior of the occupant compartment including the display device shown in FIG. 4.

In the present embodiment, the display device 13 comprises a matrix of light emitting elements 24 arranged to form a substantially continuous optical track or band around the interior perimeter of the occupant compartment 3. The light emitting elements 24 each comprise one or more light emitting diodes (LEDs). As shown in FIGS. 5 and 6, the light emitting elements 24 each have a hexagonal shape and are arranged to form a plurality of substantially continuous chains extending around the occupant compartment 3. It will be appreciated that the light emitting elements 24 could have different shapes, for example rectangular, circular or elliptical. A sequence of light emitting elements 24 each having an elliptical shape is illustrated in FIG. 7A by way of example. The light emitting elements 24 can each be controlled independently, for example to change the display colour and/or illumination level (intensity). A plurality of said light emitting elements 24 can be selectively illuminated to form a visual indicator in the form of a visual pattern P to represent the identified object 6. The light emitting elements 24 could be configured to reflect light onto the windows of the vehicle cabin. The colour and/or form and/or illumination level of the pattern P can be modified in dependence on an estimated hazard level (criticality), as illustrated in FIG. 7B. An illumination area of each light emitting element 24 within the pattern P could be controlled to create a halftone image. It will be understood that the display device 13 is not limited to light emitting diodes LED and could use other display technologies, for example an organic light emitting diode (OLED), electroluminescence or back lighting technology. The display device 13 could comprise one or more projectors for projecting the visual indicator onto an interior of the occupant compartment 3 or onto a window of the vehicle.

With reference to FIG. 3, the first output signal $S_{OUT1}$ comprises a display position signal S1, a display colour signal S2 and a display form signal S3 which control the display position, display colour and display form of the visual pattern P. The display position defines the position within the display device 13 that the visual pattern P is displayed. The display position signal S1 is generated as a function of the positional data defining the position of the identified object 6 and the vehicle speed. The display position signal S1 can also use information from the driver monitoring system 10, such as a gaze direction or a head pose. In certain embodiments, the driver monitoring system 10 could also provide information relating to one or more physical characteristics of the driver. The one or more physical characteristic(s) can, for example, relate to a determined height or weight of the driver. The one or more physical characteristics can, for example, be estimated based on a seat position, a setting of an infotainment system (personalisation) or a measurement. The one or more physical characteristics could be estimated, for example based on a percentile for a given weight.

Figure 14:
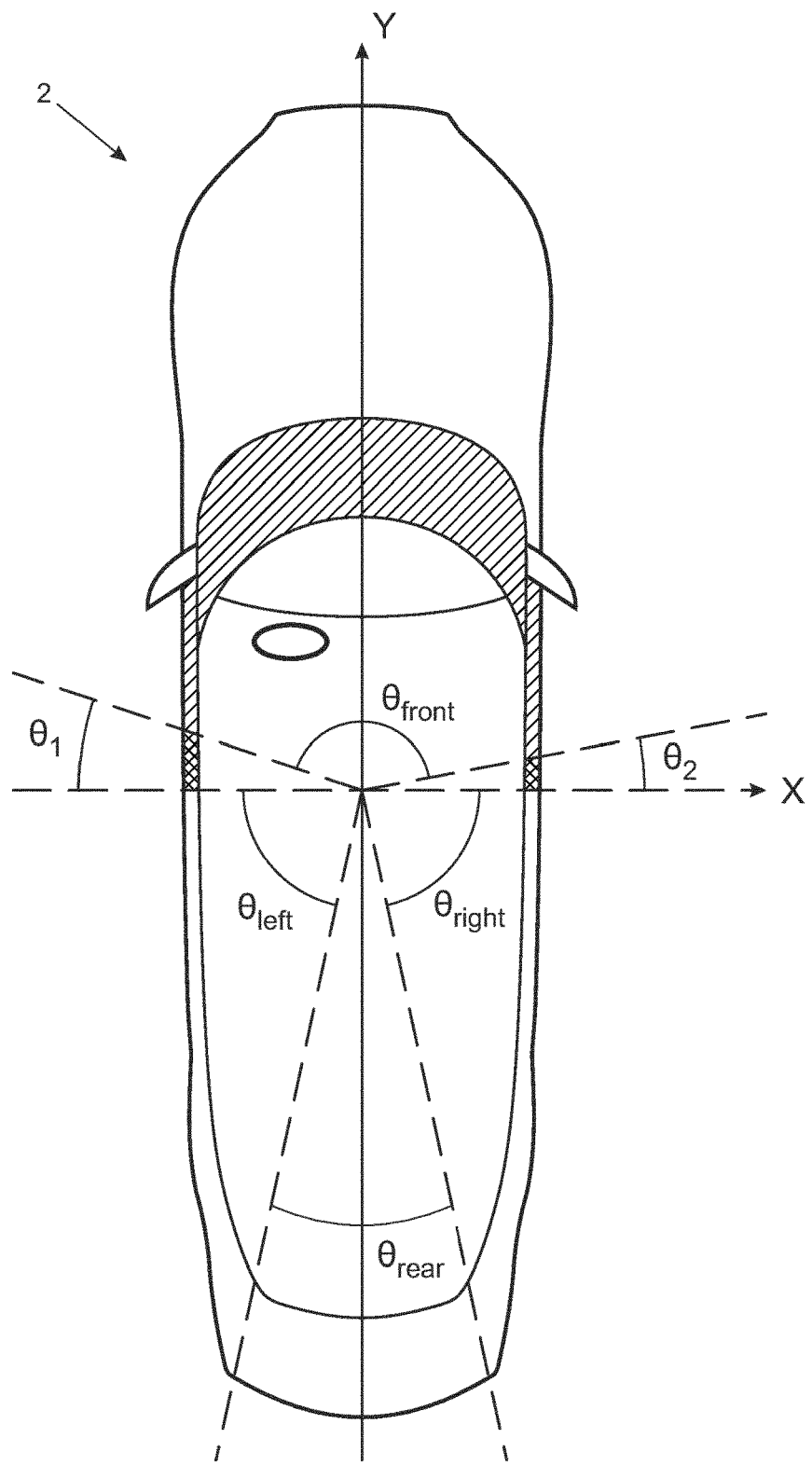
FIG. 14 shows a schematic of a vehicle incorporating a visual device and its angular parameter in accordance with an embodiment of the present invention.

With reference to FIG. 14, if an object is identified within $\theta_{rear}$ then the visual pattern P is not displayed. If an object is identified within $\theta_{left}$ then the visual pattern P is displayed within $\theta_1$ portion of the display device 13. If an object is identified within $\theta_{right}$ then the visual pattern P is displayed within $\theta_2$ portion of the display device 13. The parameter of both $\theta_1$ and $\theta_2$ can be constant or can vary depending on the speed of the vehicle. If an object is identified within $\theta_{front}$, the display device 13 shows the identified object 6.

The display colour relates to the colour of the visual pattern P and can be changed to indicate a determined risk level associated with the potential hazard. By way of example, the visual pattern P can be displayed in yellow when the determined risk level posed by the identified object 6 is relatively low; or red when the determined risk level posed by the potential hazard is relatively high. The light emitting elements 24 can display a green colour to indicate that the vehicle interface device 1 is in operation but no potential hazards have been identified. The display colour signal S2 is generated as a function of the determined time to collision (ttc) and the estimated driver reaction time. The display form signal S3 is generated as a function of the determined nature of the identified object 6. The display form signal S3 controls the display form (shape) of the visual pattern P to represent different types of objects 6. For example, a first visual pattern P can be displayed to represent a cyclist, and a second visual pattern P can be displayed to represent another vehicle. The size of the visual pattern P can be controlled in dependence on the display form signal S3. The different visual patterns P can be predefined or generated dynamically, for example derived from the object data.

The processor 7 is configured to control the display position signal S1 such that changes in the display position of the visual pattern P are substantially continuous to provide a spatially uninterrupted indication of changes in the relative angular position of the identified object 6. To indicate changes in the relative angular position of the identified object 6, the visual pattern P travels progressively within the display device 13 to provide a scrolling effect providing an uninterrupted (seamless) representation of changes in the relative angular position of the identified object 6. The display position of the visual pattern P can change in a horizontal direction to indicate changes in the relative angular position of the identified object 6. The size and/or illumination level of the visual pattern P could also be controlled, for example to indicate a determined range to the identified object 6 and/or a determined size of the identified object 6. Alternatively, or in addition, the display position of the visual pattern P can change in a vertical direction to indicate that the identified object 6 is travelling towards and/or away from the vehicle 2. For example, the visual pattern P can travel upwardly within those vertical portions of the display device 13 disposed on the A-pillar 23 (and optionally also the B-pillar and/or the C-pillar and/or the D-pillar) to indicate that the identified object 6 is travelling towards the vehicle 2.

Figure 8:
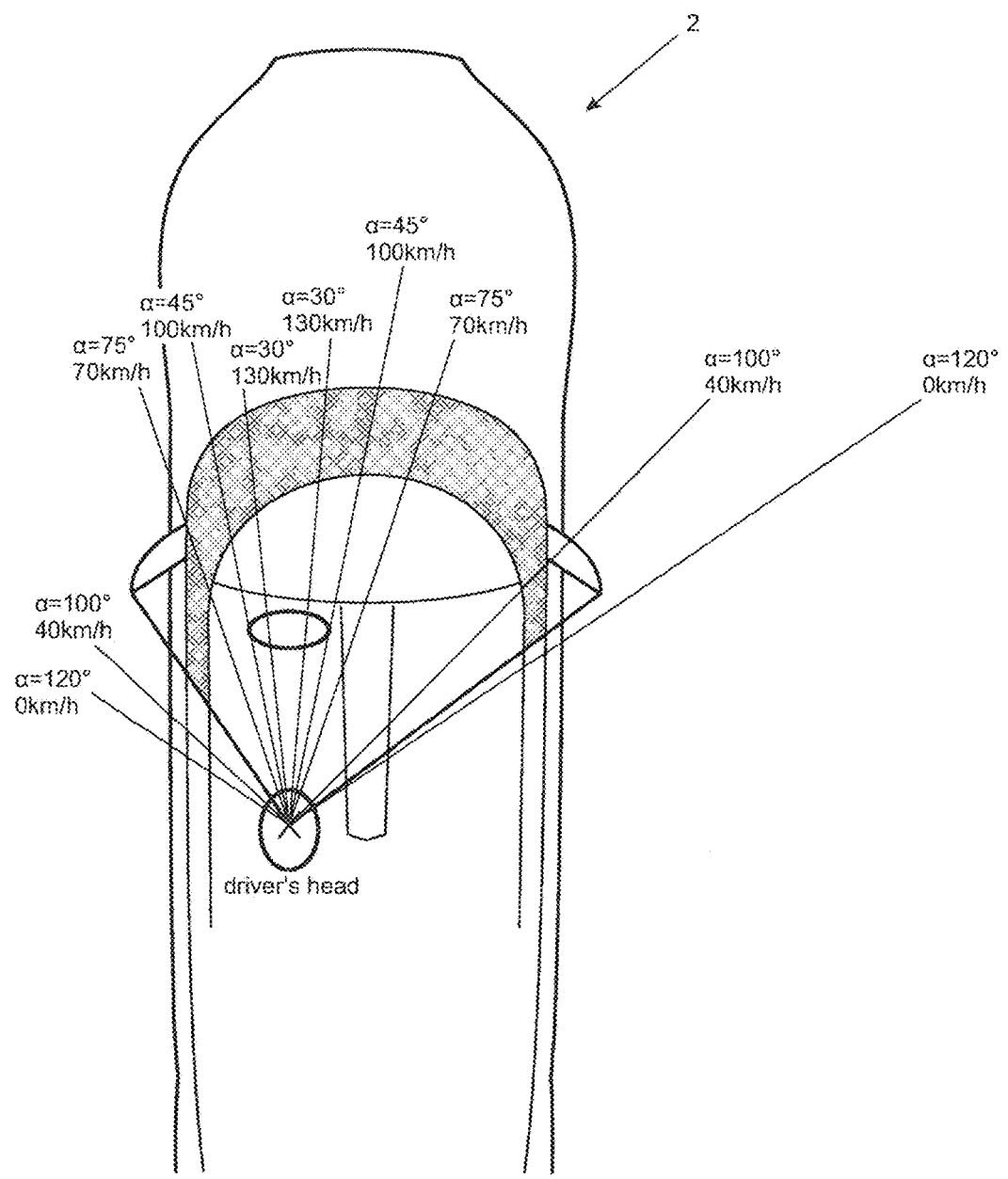
FIG. 8 illustrates changes in the field of view of the driver in dependence on vehicle speed.

The processor 7 can also be configured to control the size and/or position and/or illumination level of the visual pattern P depending on the field of vision of the driver. The field of vision of the driver is illustrated in FIG. 5 by a central line of vision, with near-peripheral and mid-peripheral regions represented by concentric circles. Significantly, the field of vision of the driver tends to change in dependence on the speed of the vehicle 2. As illustrated in FIG. 8, a field of vision a of the driver narrows as the speed of the vehicle 2 increases. The processor 7 can be configured to adjust the display position of the visual pattern P and/or the size (lateral extent) of the visual pattern P in conjunction with increasing vehicle speed. The prominence of the visual pattern P can thereby be increased with vehicle speed.

The processor 7 can take into account additional control factors. For example, the processor 7 can use the driver size as a further input to determine the display position of the visual pattern P. For example, if the driver is small (necessitating a forward seating position), the processor 7 can translate the display position of the visual pattern P towards the front of the occupant compartment to improve visibility of the visual pattern P. The driver size can be determined by processing the image data received from the driver monitoring camera. Alternatively, the driver size can be estimated based on the position of the driver seat and/or a measured weight of the driver.

The audio device 14 is an object-based audio system configured to generate a multi-dimensional audio alert in dependence on the second output signal $S_{OUT2}$ generated by the processor 7. The audio alert conveys positional information and/or movement information relating to the identified object 6. The audio device 14 is configured to output an acoustic pattern which is audible within the occupant compartment 3. In the present embodiment, the audio device 14 comprises a rendering station 28 configured to generate an object-based audio output which can combine different sound elements with metadata to form an audio object 29 (or a plurality of audio objects 29). The audio object 29 is an acoustic event perceived in space that may or may not occupy the same location as a loudspeaker. The audio object 29 has physical parameters that are manipulated to provide a change in the perceived location of the audio object 29 representing changes to the state of the identified (physical) object 6. This is different from the "phantom centre" experienced when a listener sits between two stereo loudspeakers because the centre image cannot be manipulated as a result of external factors.

The metadata utilised by the rendering station 28 is generated in dependence on the determined position of the identified object 6, for example the determined relative angular position (heading) and/or range of the identified object 6. The rendering station 28 can control the perceived spatial location of the audio object 29 in three-dimensions. The perceived spatial location of the audio object 29 conveys information relating to the position of the identified object 6 in relation to the vehicle 2. By way of example, the perceived spatial location of the audio object 29 can provide an indication of the relative angular position of the identified object 6. Moreover, the perceived spatial location of the audio object 29 can be changed to represent changes in the relative angular position of the identified object 6. One or more characteristics of the audio object 29 can also be controlled to convey information relating to the identified object 6. For example, a sound effect transmitted in said audio object 29 can be selected to indicate the nature of the identified object 6. The amplitude of the audio object 29 can be controlled to indicate a range to the identified object 6.

Figure 9:
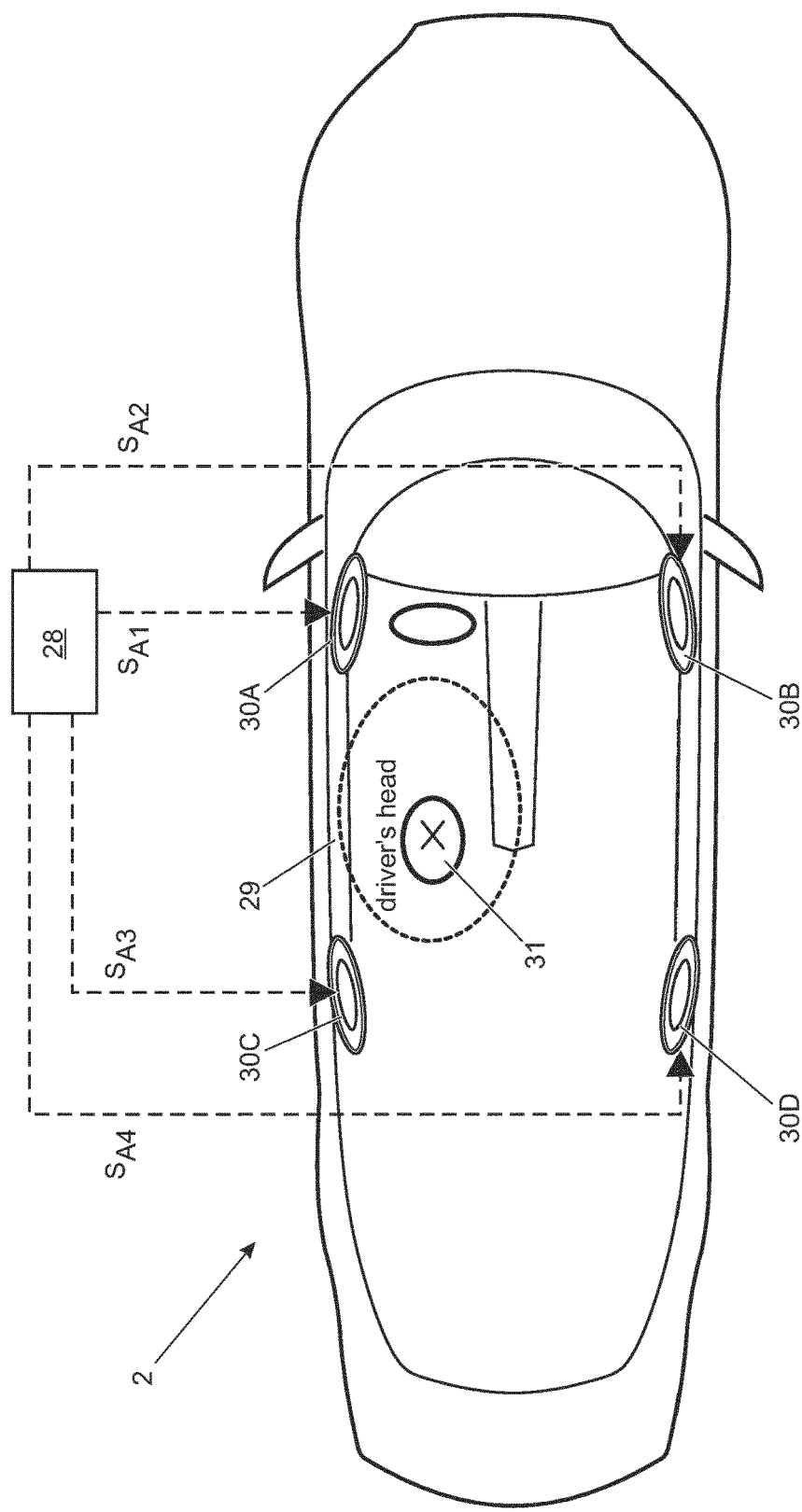
FIG. 9 shows a schematic representation of an audio device in accordance with an embodiment of the present invention.

As illustrated in FIG. 9, the audio object 29 is centred on the determined position of the driver's head 31. The metadata defines how the sound element should be reproduced in the sound stage (i.e. within the occupant compartment 3), by defining its position in a three-dimensional (3-D) field using vector information, audio level information, etc. The rendering station 28 is coupled to a plurality of acoustic transducers disposed within the occupant compartment 3. In the present embodiment the acoustic transducers are in the form of loudspeakers 30. In the illustrated arrangement, the rendering station 28 is coupled to four (4) loudspeakers 30A-D. As described herein, the rendering station 28 maps the second output signal $S_{OUT2}$ from the processor 7 to an audio program and generates separate audio control signals $S_{A1-4}$ for each loudspeaker 30A-D. The audio control signals $S_{A1-4}$ control the audio output from each loudspeaker 30A-D which combine to form the audio object 29. The rendering station 28 generates the information in real-time for each audio object 29 depending on the configuration of the loudspeakers 30 within the occupant compartment 3. The resulting audio object 29 conveys directional information to an occupant of the vehicle 2, typically the driver. The audio device 14 can thereby provide an audio indication of the determined relative angular position of the identified object 6. Moreover, by modifying the perceived spatial location of the audio object 29, the rendering station 28 can convey information relating to the movement of the identified object 6 relative to the vehicle 2. It will be appreciated that the loudspeakers 30A-D may be different from each other, for example not having equal or equivalent frequency bandwidth. To implement the identified object based system, the characteristics and/or bandwidth limitations of each loudspeaker 30A-D are available to the processor 7 to appropriate adjustments to the distribution of acoustic energy.

The rendering station 28 could, for example, be configured to change the spatial location of the audio object 29 in dependence on the determined angular position of the identified object 6 relative to the vehicle 2. The spatial relationship between the vehicle 2 and the identified object 6 can be used to define the perceived spatial location of the audio object 29. In particular, the perceived angular position of the audio object 29 can correspond to the angular position of the identified object 6 in relation to the vehicle 2. The audio device 14 could optionally implement a sound shower such that the audio object 29 can be heard only in the driver area, thereby reducing disturbance to other occupants.

The perceived vertical location of the audio object 29 can be varied to convey additional information, for example relating to the size or nature of the identified object 6. The perceived vertical location of the audio object 29 could be relatively low to indicate that the identified object 6 is relatively small (for example to indicate that a child has been identified); and relatively high to indicate that the identified object 6 is relatively large (for example to indicate that an adult or a cyclist has been identified). Equally, the perceived vertical location of the audio object 29 could be adjusted to indicate range (distance), a relatively high perceived vertical location representing a relatively large range to the identified object 6 and a relatively low perceived vertical location representing a relatively small range to the identified object 6.

With reference to FIG. 3, the second output signal $S_{OUT2}$ comprises an audio direction signal S4, an audio amplitude signal S5, an audio frequency signal S6, and an audio signature signal S7. The audio direction signal S4 is generated as a function of the positional data defining the relative angular position of the identified object 6 and also a determined position of the driver's head 31. The position of the driver's head 31 can be determined by the driver monitoring system 10, or could be estimated (for example based on the position of the driver seat). The audio amplitude signal S5 is generated as a function of the determined time to collision (ttc), the driver reaction time and the driver auditory capabilities. The audio frequency signal S6 can be generated as a function of the determined range to the identified object 6. The audio signature can be defined to facilitate determination of the nature of the identified object 6 by the occupant of the vehicle 2. The audio signature signal S7 can be generated as a function of the determined nature of the identified object 6. For example, a first audio signature can be output if the identified object 6 is identified as another vehicle (such as the sound of a vehicle horn); a second audio signature (such as the ringing of a bicycle bell) can be output if the identified object 6 is identified as a cyclist; a third audio signature (such as the sound of voices) can be output if the identified object 6 is identified as a pedestrian; and a fourth audio signature (such as the sound of a dog barking) can be output if the identified object 6 is identified as an animal. One or more of the aforementioned audio signatures can be used. The second output signal $S_{OUT2}$ can optionally also comprise an audio signature signal generated as a function of the determined nature of the identified object 6.

The haptic device 15 is configured to generate a haptic alert in dependence on the third output signal $S_{OUT3}$ generated by the processor 7. The haptic alert is configured to convey positional information and/or movement information relating to the identified object 6. The haptic device 15 is associated with a driver seat 32 disposed in the occupant compartment 3. As shown in FIG. 10, the driver seat 32 comprises a seat cushion 33, a seat squab 34 and a head rest 35. A weight sensor 36 is incorporated into the seat cushion 33 to weigh the driver. A haptic effect generating device 37 is incorporated into the seat squab 34 (and optionally also the seat cushion 33) to output a haptic pattern which is sensed by the driver. In the present embodiment the haptic effect generating device 37 comprises an array of vibration generators 38 that can be controlled independently of each other. The vibration generators 38 can, for example, each comprise an electric actuator (such as a piezoelectric actuator), an eccentric rotating element, or a vibratory transducer. In the illustrated arrangement, the haptic effect generating device 37 comprises nine (9) vibration generators 38. The haptic device 15 comprises a haptic control unit 39 configured to control operation of said vibration generators 38 in dependence on the third output signal $S_{OUT3}$. Specifically, the haptic control unit 39 is configured to output haptic control signals $S_H$ to control each vibration generator 38 independently. It will be understood that less than, or more than nine (9) vibration generators 38 can be incorporated into the haptic effect generating device 37. Alternatively, or in addition, the haptic effect generating device 37 could comprise one or more of the following: an ultrasonic transducer (for example haptic touchless technology), an electric actuator (such as a piezoelectric actuator) and a vibratory transducer.

The haptic effect generating device 37 is controlled in dependence on the third output signal $S_{OUT3}$ selectively to energize one or more of the vibration generators 38 to generate a haptic pattern. The haptic pattern is controlled to convey information to the driver of the vehicle 2 relating to the identified object 6, for example to indicate a relative angular position and/or relative angular movement of the detected object 6. As shown in FIG. 10, the vibration generators 38 are arranged in the seat squab 34 in a 3×3 matrix consisting of three columns Y1-3 and three rows X1-3. By selectively activating one or more vibration generators 38 in each column Y1-3, the haptic effect generating device 37 can convey positional information to the driver. For example, by activating the vibration generators 38 in the middle column Y2 a haptic alert can be generated to indicate that the identified object 6 is directly behind the vehicle 2. By activating the vibration generators 38 in the left column Y1, a haptic alert can be generated to indicate that the identified object 6 is to the left of the vehicle 2. Conversely, by activating the vibration generators 38 in the right column Y3, a haptic alert can be generated to indicate that the identified object 6 is to the right of the vehicle 2. By sequencing activation of the vibration generators 38 and/or controlling the magnitude of the vibrations, the haptic alert can convey the relative angular position of the identified object 6. For example, the vibration generators 38 in the central column Y2 could initially be activated to indicate that the identified object 6 is behind the vehicle 2; and then the vibration generators 38 in the right column Y3 can be activated to indicate that the identified object 6 is passing to the right of the vehicle 2. By sequentially activating the vibration generators 38, the haptic feedback can be moved in order to indicate the relative angular position of the identified object 6. It will be understood that providing more vibration generators 38 allows increased resolution of the haptic alert, for example more precisely to indicate the relative angular position of the identified object 6. The vibration generators 38 could be provided in lumbar supports provided on each side of the seat squab 34 to provide additional directional information. Additionally, or alternatively, the vibration generators 38 could be incorporated into the seat cushion 33, for example arranged in a longitudinal direction and/or a transverse direction.

Figure 16:
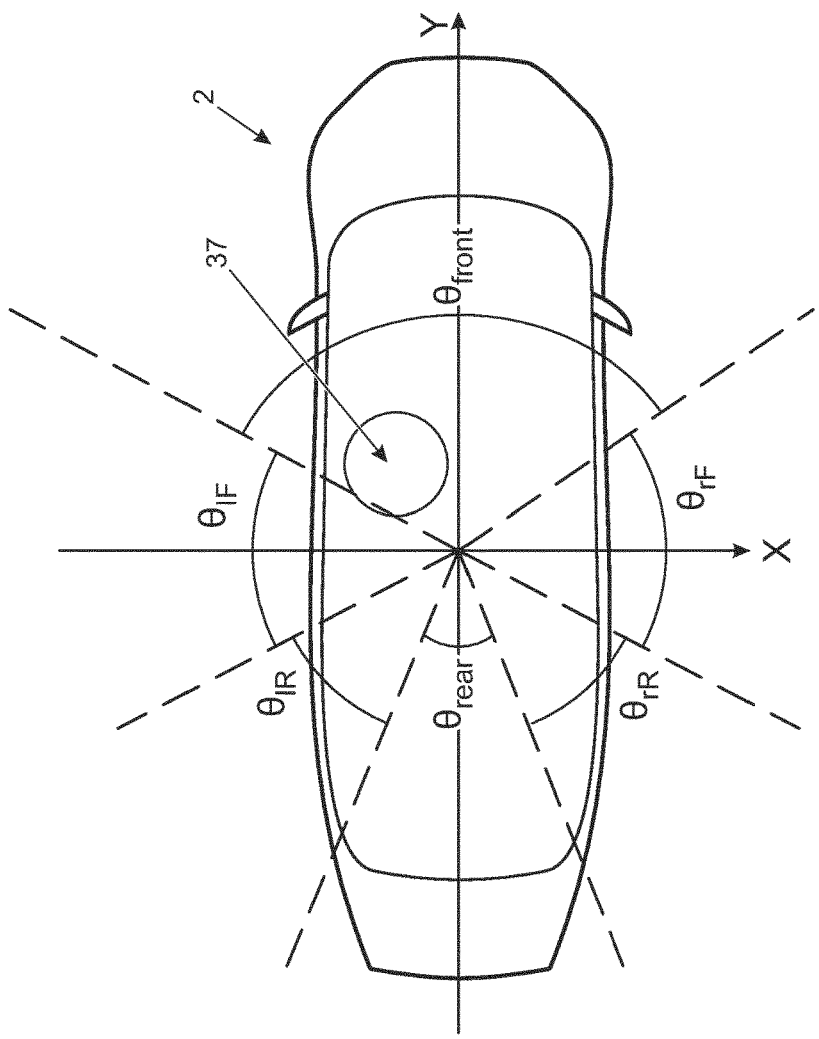
FIG. 16 shows a schematic of a vehicle incorporating a visual device and its angular parameter in accordance with an embodiment of the present invention.
Figure 15:
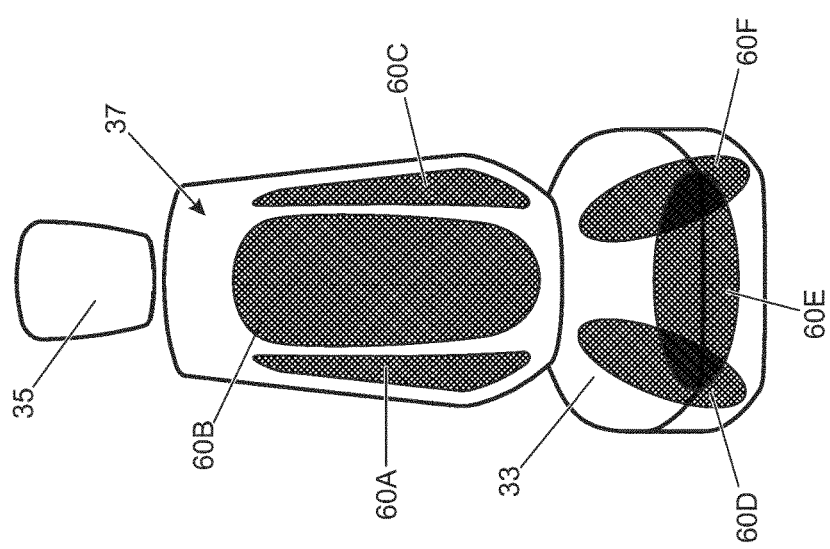
FIG. 15 shows a vehicle seat incorporating a haptic device in accordance with an embodiment of the present invention.

In another embodiment one or more of the vibration generators 38 are arranged so that they are positioned and/or grouped within different portions of the haptic effect generating device 37. FIG. 15 shows the haptic effect generating device being incorporated in a vehicle seat. The number of the generators 38 (not shown) depends on the shape, size and the packaging of the haptic effect generating device 37. Each portion 60A-F of the seat corresponds to a predetermined angular chart. FIG. 16 shows an example of the angular chart with possible angular divisions $\theta_{front}$, $\theta_{rear}$, $\theta_{lF}$, $\theta_{rF}$, $\theta_{lR}$ and $\theta_{rR}$ which corresponds to bottom centre 60E, top centre 60B, bottom left 60F, bottom right 60D, top left 60C and top right 60A portion of the seat respectively. When the objection is identified within the charted angular positions $\theta_{front}$, $\theta_{rear}$, $\theta_{lF}$, $\theta_{rF}$, $\theta_{lR}$ and $\theta_{rR}$, the corresponding portion(s) 60A-F of the haptic generating device 37 is activated to provide representative feedback to the driver. The angular chart can be configured with respect to the centre of the vehicle or the position of the driver/driver's seat.

The amplitude and/or frequency of the haptic pattern can be controlled to convey additional information, such as a hazard level (criticality) posed by the identified object 6. For example, the amplitude of the haptic pattern could be increased if the processor 7 determines that the identified object 6 is a particular hazard. The hazard level can, for example, be calculated based on the determined time to collision (ttc) and the reaction time of the driver. The amplitude and/or frequency of the haptic pattern could be modified to indicate the form of the identified object 6.

With reference to FIG. 3, the third output signal $S_{OUT3}$ comprises a haptic direction signal S8, a haptic amplitude signal S9 and a haptic magnitude signal S10. The haptic direction signal S8 is generated as a function of the positional data defining the relative angular position of the identified object 6. The haptic amplitude signal S9 and the haptic magnitude signal S10 are generated as functions of the determined time to collision (ttc) and optionally also the determined reaction time of the driver.

The processor 7 can also be configured to control operation of the haptic effect generating device 37 in dependence on a determined contact between the driver and the seat squab 34. Using weight percentiles, a contact pattern between the driver and the seat cushion 33 and the seat squab 34 can be estimated. By way of example, a first contact pattern 40A for a 5th percentile is shown in FIG. 11A; a second contact pattern 40B for a 50th percentile is shown in FIG. 11B: and a third contact pattern 40C for a 95th percentile is shown in FIG. 11C. The haptic control unit 39 can be configured to control the haptic pattern in dependence on the weight of the driver measured by the weight sensor 36. For example, the location of the haptic pattern output by the haptic effect generating device 37 can be modified in dependence on the measured weight of the driver. Alternatively, or in addition, the amplitude of the haptic pattern can be modified in dependence on the measured weight of the driver. At least in certain embodiments, this control strategy can help to ensure that the haptic pattern provides feedback which is commensurate with a determined hazard level. For example, if the measured weight determines that the driver is in the 95th percentile, the amplitude of the haptic pattern can be lower than for a driver in the 5th percentile due to the increased contact between the driver and the seat cushion 33 and the seat squab 34. The processor 7 can be configured to characterise additional parameters relating to the driver, for example relating to the clothing being worn. The processor 7 can perform image processing on image data received from a driver-facing camera to identify the clothing, for example to determine if the driver is wearing a jacket. This processing could be an extension of a facial recognition algorithm. The processor 7 can adjust the magnitude of the haptic pattern in dependence on the determined clothing characterisation.

The haptic effect generating device 37 could utilise an array of ultrasonic transducers in place of (or in addition to) the vibration generators 38. The ultrasonic generators could be incorporated into the seat cushion 33 and/or the seat squab 34 and/or the head rest 35. In this arrangement, one or more of said ultrasonic generators can be activated to generate the haptic pattern which is sensed by the driver. The haptic pattern can be controlled by selectively activation of one or more of said ultrasonic generators. In use, the ultrasonic transducers could be configured to generate an ultrasonic signal that is transmitted through the air and is felt by the driver. Thus, the ultrasonic transducers are operable to transmit the haptic pattern when the driver is not in direct contact with the driver seat 32.

In an alternative arrangement, the haptic pattern could be generated by controlling an airflow incident on the driver of the vehicle 2. The haptic effect generating device 37 could utilise one or more air vents to control the airflow to generate the haptic pattern. The one or more air vents could be incorporated into the driver seat 32, for example into a head rest; and/or into a door of the vehicle 2; and/or into a B-pillar of the vehicle 2. The one or more air vents could be selectively opened/closed to control airflow incident on the driver, for example on the back of the driver's head, neck or shoulders. The resulting haptic pattern can be used to notify the driver of the relative angular position and/or relative movement of the identified object 6. The extent to which each air vent is opened could be controlled to control the strength of the incident airflow. Alternatively, or in addition, the haptic effect generating device 37 could comprise an adjustable nozzle (not shown) which can be controlled to change the direction of the incident airflow. An operating speed of a fan unit for generating the airflow could be controlled. The incident airflow could be pulsed. The pulsed airflow could be controlled to convey additional information, such as the nature of the identified object 6 and/or a hazard level. For example, the frequency of the pulses could be increased to signal a reduction in the range to the identified object 6.

The operation of the vehicle interface device 1 will now be described with reference to a first example illustrated in FIGS. 12A-C. The first example relates to a scenario in which the identified object 6 is a cyclist approaching from behind the vehicle 2. The cyclist is initially only visible in a vehicle side mirror, but is detected by the rear-facing camera 19. The ADAS 9 determines the relative angular position of the cyclist and generates the first input signal $S_{IN1}$ for the processor 7. In dependence on the first input signal $S_{IN1}$, the processor 7 generates the second output signal $S_{OUT2}$ which includes the audio direction signal S4, the audio amplitude signal S5, the audio frequency S6 and the audio signature S7. The rendering station 28 generates the audio object 29 which provides an initial notification to the driver of the vehicle 2 that the cyclist has been detected. The perceived spatial location of the audio object 29 serves also to notify the driver of the relative angular position of the cyclist. In the present example, the audio object 29 is initially generated behind and to the right of the driver to notify the driver that the cyclist is approaching from this direction, as illustrated in FIG. 12A. The processor 7 also generates the first output signal $S_{OUT1}$ which includes the display position signal S1, the display colour signal S2 and the display form signal S3. The visual pattern P is displayed by the display device 13 at a display position corresponding to the determined relative angular position of the cyclist. As illustrated in FIGS. 12B and 12C, the display position changes progressively as the relative angular position of the cyclist changes. The visual pattern P thereby sweeps along the right lateral panel 21R and into the front panel 20 to provide a continuous indication of the relative angular position of the cyclist. As shown in FIG. 12B, when the cyclist is partially obscured, the visual pattern P is displayed on the inside of the A-pillar 23 to ensure that the driver is aware of their continued presence proximal to the vehicle 2. The visual pattern P is centred on the closest portion of the identified object 6 to the vehicle 2. The perceived spatial location of the audio object 29 is adjusted continuously to match the movement of the cyclist in relation to the vehicle 2. In the present example, the perceived spatial location of the audio object 29 travels forward on the right hand side of the driver as the cyclist passes the vehicle 2. The volume of the audio object 29 is controlled based on the measured range to the cyclist.

The processor 7 outputs the third output signal $S_{OUT3}$ to control operation of the haptic device 15. The haptic device 15 operates throughout the sequence to provide an additional communication means. In particular, the vibration generators 38 in the central column Y2 are activated initially when the cyclist is detected behind the vehicle 2. The intensity of the vibrations is adjusted based on the measured range to the cyclist. As the cyclist approaches on the right hand side of the vehicle 2, the vibration generators 38 in the right column Y3 generate vibrations which progressively increase in magnitude while those generated by the vibration generators 38 in the central column Y2 progressively decrease. When the cyclist is alongside the vehicle 2, only those vibration generators 38 in the right hand column Y3 are active. The magnitude of the vibrations decreases as the cyclist moves further away from the vehicle 2. The vibration generators 38 thereby generate a haptic pattern which also conveys relative angular position and movement information to the driver.

The processor 7 can be configured to control output of the first, second and third output signals $S_{OUT1-3}$ to control activation of the display device 13, the audio device 14 and the haptic device 15 to convey different information. The display device 13, the audio device 14 and the haptic device 15 can be activated independently of each other to convey information relating to different identified hazards, for example in dependence on a determined priority of a plurality of potential hazards or in dependence on an identified region in which the hazards is identified. The processor 7 can control an activation sequence of the display device 13, the audio device 14 and the haptic device 15, for example depending on a personal preference setting or depending on a determined urgency. By way of example, the haptic device 15 can be activated when there is an imminent hazard to provide direct feedback to the driver.

The operation of the vehicle interface device 1 will now be described with reference to a second example illustrated in FIGS. 13A-C. The second example relates to another scenario in which the identified object 6 is a cyclist which the vehicle 2 is overtaking. The cyclist is visible through the front windshield 4 and is detected by the radar sensor 16. The ADAS 9 determines the relative angular position of the cyclist and generates the first input signal $S_{IN1}$ for the processor 7. In dependence on the first input signal $S_{IN1}$, the processor 7 generates the second output signal $S_{OUT2}$ which includes the audio direction signal S4, the audio amplitude signal S5, the audio frequency S6 and the audio signature S7. The rendering station 28 generates the audio object 29 to provide an initial alert to notify the driver of the vehicle 2 that the cyclist is approaching on the right hand side of the vehicle 2, as illustrated in FIG. 13A. The processor 7 also generates the first output signal $S_{OUT1}$ which includes the display position signal S1, the display colour signal S2 and the display form signal S3. The visual pattern P is displayed by the display device 13 at a display position corresponding to the determined relative angular position of the cyclist. The rendering station 28 generates an audio pattern in dependence on the second output signal $S_{OUT2}$ and the haptic device 15 generates a haptic pattern in dependence on the third output signal $S_{OUT3}$. The perceived spatial location of the audio object 29 serves also to notify the driver of the relative angular position of the cyclist. As illustrated in FIGS. 13B and 13C, the display position changes progressively as the relative angular position of the cyclist changes.

The visual pattern P thereby sweeps along the right lateral panel 21R to provide a continuous indication of the relative angular position of the cyclist. As shown in FIGS. 13B and 13C, when the cyclist is partially obscured, the visual pattern P is displayed on the inside of the A-pillar 23 to ensure that the driver is aware of their continued presence proximal to the vehicle 2. The visual pattern P is centred on the closest portion of the identified object 6 to the vehicle 2.

It will be appreciated that various changes and modifications can be made to the vehicle interface device without departing from the scope of the present invention. The vehicle interface device has been described herein with reference to implementing three modalities, namely visual, audio and haptic feedback. It will be appreciated that the vehicle interface device could be implemented with only one of said modalities or two of said modalities.

The illumination level (or intensity) of the illuminating elements can be controlled individually within the visual pattern P to indicate a measured distance between the vehicle and the identified object 6. The measured distance could be the shortest distance between the vehicle 2 and the identified object 6, for example measured normal to an exterior of the vehicle 2; or could be the distance measured relative to a reference point in the vehicle 2. By varying the illumination level within the visual pattern P, a sense of depth or perspective can be conveyed.

The user can set preferences for operation of the visual device 13, the audio device 14 and the haptic device 15.

Further aspects of the present invention are set out in the following numbered paragraphs:

1. A vehicle interface device for generating a haptic indication of a potential hazard, the vehicle interface device comprising:
   at least one haptic generator configured to generate a haptic signal; and
   a processor for controlling said haptic generator;
   wherein the processor is configured to:
     in dependence on object data relating to an object representing a potential hazard, determine an angular position of the identified object relative to the vehicle;
     generate a control signal to cause the haptic generator to output a haptic signal for providing an indication of the determined relative position of the identified object; and
     modify the control signal to progressively change the generated haptic signal to represent changes in the relative angular position of the identified object.

2. A vehicle interface device as described in paragraph 1, wherein the processor is configured to receive said object data from sensor means disposed on the vehicle.

3. A vehicle interface device as described in paragraph 1 comprising a plurality of said haptic generators, wherein the processor is configured to control activation of said haptic generators to represent changes in the relative angular position to the identified object from the vehicle.

4. A vehicle interface device as described in paragraph 1, wherein the at least one haptic generator comprises a vibration generator.

5. A vehicle interface device as described in paragraph 1, wherein the at least one haptic generator comprises an ultrasonic transducer for generating an ultrasonic signal.

6. A vehicle interface device as described in paragraph 5, wherein the ultrasonic transducer is configured to control the output direction of said ultrasonic signal to represent changes in the relative angular position to the identified object from the vehicle.

7. A vehicle interface device as described in paragraph 1, wherein the at least one haptic generator comprises an air vent for generating the haptic signal in the form of a jet of air.

8. A vehicle interface device as described in paragraph 7, wherein the air vent comprises an adjustable nozzle for controlling the direction of the jet of air to represent changes in the relative angular position to the identified object from the vehicle.

9. A vehicle interface device as described in paragraph 1, wherein the at least one haptic generator is disposed within a seat in the occupant compartment.

10. A vehicle interface device as described in paragraph 9 comprising means for determining occupant contact with the seat; wherein the processor is configured to control activation of said at least one haptic generator in dependence on the determined occupant contact with the seat.

11. A vehicle interface device as described in paragraph 1, wherein the processor is configured to determine a trajectory of the identified object in dependence on the identified object data; and to modify the haptic signal in dependence on the determined trajectory.

12. A vehicle interface device as described in paragraph 1, wherein the processor is configured to determine a time to collision in dependence on the identified object data; and to modify the haptic signal in dependence on the determined time to collision.

13. A vehicle interface device as described in paragraph 1, wherein the processor is configured to determine a nature of the identified object in dependence on the identified object data; and to modify the haptic signal in dependence on the determined nature.

14. A vehicle interface device as described in paragraph 1, wherein the processor is configured to modify the haptic signal by changing one or more of the following parameters: amplitude, frequency, magnitude, haptic pattern; and pattern form.

15. A vehicle interface device as described in paragraph 1, wherein the vehicle interface device is also suitable for generating a visual indication of a potential hazard, the vehicle interface device comprising:
   display means configured to extend around at least a portion of a perimeter of an occupant compartment in a vehicle; and
   a processor for controlling said display means;
   wherein the processor is configured to:
      in dependence on object data relating to an identified object representing a potential hazard, determine an angular position of the identified object relative to the vehicle;
      generate a control signal to cause the display means to display a visual indicator at a display position in said display means corresponding to the determined relative angular position of the identified object; and
      modify the control signal to progressively change the display position of the visual indicator within the display means at least substantially to match changes in the relative angular position of the identified object.

16. A vehicle interface device as described in paragraph 1, wherein the vehicle interface device is also suitable for generating an audible indication of a potential hazard, the vehicle interface device comprising:
   at least one electroacoustic transducer configured to generate an audible signal; and
   a processor for controlling said at least one electroacoustic transducer;
   wherein the processor is configured to:
      in dependence on object data relating to an identified object representing a potential hazard, determine an angular position of the object relative to the vehicle;
      generate a control signal to cause the at least one electroacoustic transducer to generate an audio object; and
      modify the control signal to progressively change a perceived spatial location of the audio object to represent changes in the relative angular position of the identified object.

17. A vehicle comprising a vehicle interface device as described in paragraph 1.

18. A method of generating a haptic indication of a potential hazard, the method comprising:
   in dependence on object data relating to an identified object representing a potential hazard, determining an angular position of the identified object relative to a vehicle;
   generating a haptic signal for providing an indication of the determined relative position of the identified object; and
   progressively changing the generated haptic signal to represent changes in the relative angular position of the identified object.

19. A method as described in paragraph 18 comprising receiving said object data from sensor means disposed on the vehicle.

20. A method as described in paragraph 18 or paragraph 19 comprising controlling activation of a plurality of said haptic generators to represent changes in the relative angular position to the identified object from the vehicle.

21. A method as described in any one of paragraphs 18, 19 or 20, wherein the at least one haptic generator comprises a vibration generator.

22. A method as described in any one of paragraphs 18, 19 or 20, wherein the at least one haptic generator comprises an ultrasonic transducer for generating an ultrasonic signal.

23. A method as described in paragraph 22, wherein the ultrasonic transducer is configured to control the output direction of said ultrasonic signal to represent changes in the relative angular position to the identified object from the vehicle.

24. A method as described in any one of paragraphs 18, 19 or 20, wherein the at least one haptic generator comprises an air vent for generating the haptic signal in the form of a jet of air.

25. A method as described in paragraph 24, wherein the air vent comprises an adjustable nozzle for controlling the direction of the jet of air to represent changes in the relative angular position to the identified object from the vehicle.

26. A method as described in any one of paragraphs 18 to 25, wherein the at least one haptic generator is disposed within a seat in the occupant compartment.

27. A method as described in paragraph 26 comprising determining occupant contact with the seat; and controlling activation of said at least one haptic generator in dependence on the determined occupant contact with the seat.

28. A method as described in any one of paragraphs 18 to 27 comprising determining a trajectory of the identified object in dependence on the identified object data; and modifying the haptic signal in dependence on the determined trajectory.

29. A method as described in any one of paragraphs 18 to 28 comprising determining a time to collision in dependence on the identified object data; and modifying the haptic signal in dependence on the determined time to collision.

30. A method as described in any one of paragraphs 18 to 29 comprising determining a nature of the identified object in dependence on the identified object data; and modifying the haptic signal in dependence on the determined nature.

31. A method as described in any one of paragraphs 18 to 30 comprising modifying the haptic signal by changing one or more of the following parameters: amplitude, frequency, magnitude, haptic pattern; and pattern form.

32. A method as described in any one of paragraphs 18 to 31 comprising generating a visual indication of a potential hazard, the method comprising:
in dependence on object data relating to an identified object representing a potential hazard, determining an angular position of the identified object relative to a vehicle;
displaying a visual indicator at a display position corresponding to the determined relative angular position of the identified object; and
progressively changing the display position of the visual indicator at least substantially to match changes in the relative angular position of the identified object.

34. A method as described in any one of paragraphs 18 to 32 comprising generating an audible indication of a potential hazard, the method comprising:
in dependence on object data relating to an identified object representing a potential hazard, determining an angular position of the object relative to a vehicle;
generating an audible signal for providing an indication of the determined relative angular position of the object; and
progressively modifying the generated audible signal to represent changes in the relative angular position of the identified object.

The invention claimed is:

1. A vehicle interface device for generating a haptic indication of a potential hazard, the vehicle interface device comprising:
a plurality of haptic generators configured to generate respective haptic signals; and
a processor for controlling the plurality of haptic generators;
wherein the processor is configured to:
in dependence on object data relating to an identified object representing a potential hazard, determine an angular position of the identified object relative to the vehicle;
generate a control signal to cause the plurality of haptic generators to output the respective haptic signals for providing an indication of the angular position of the identified object relative to the vehicle; and
modify the control signal to progressively increase a magnitude of a haptic signal generated by a first one of the plurality of haptic generators while progressively decreasing a magnitude of a haptic signal generated by a second one of the plurality of haptic generators positioned adjacent to the first one of the plurality of haptic generators to represent a change in the relative angular position of the identified object.

2. The vehicle interface device of claim 1, wherein the processor is configured to receive the object data from a sensor disposed on the vehicle.

3. The vehicle interface device of claim 1, wherein the plurality of haptic generators comprise a vibration generators.

4. The vehicle interface device of claim 1, wherein each of the plurality of haptic generators comprises:
an ultrasonic transducer configured to generate an ultrasonic signal, optionally wherein the ultrasonic transducer is configured to control an output direction of the ultrasonic signal to represent changes in the angular position of the identified object relative to the vehicle; or
an air vent configured to generate the haptic signal as a jet of air, optionally wherein the air vent comprises an adjustable nozzle for controlling a direction of the jet of air to represent changes in the relative angular position to the identified object from the vehicle.

5. The vehicle interface device of claim 1, wherein the plurality of haptic generators are is disposed within a seat in an occupant compartment of the vehicle, optionally wherein the vehicle interface device further comprises a sensor configured to determine occupant contact with the seat, and wherein the processor is configured to control activation of the plurality of haptic generators in dependence on occupant contact with the seat.

6. The vehicle interface device of claim 1, wherein the processor is configured to:
determine a trajectory of the identified object in dependence on the object data and to modify the respective haptic signals generated by the plurality of haptic generators in dependence on the determined trajectory; and/or
determine a time to collision in dependence on the object data and modify the respective haptic signals generated by the plurality of haptic generators in dependence on the determined time to collision; and/or
determine a nature of the identified object in dependence on the object data and modify the respective haptic signals generated by the plurality of haptic generators in dependence on the determined nature.

7. The vehicle interface device of claim 1, wherein the processor is configured to modify the respective haptic signals generated by the plurality of haptic generators by changing one or more of the following parameters: amplitude, frequency, magnitude, haptic pattern, and pattern form.

8. The vehicle interface device of claim 1, further comprising:
a display configured to extend around at least a portion of a perimeter of an occupant compartment in a vehicle; and
wherein the processor is configured to control the display and:
generate a control signal to cause the display to display a visual indicator at a display position in the display corresponding to the angular position of the identified object relative to the vehicle; and
modify the control signal to progressively change the display position of the visual indicator in the display at least substantially to match changes in the angular position of the identified object relative to the vehicle.

9. The vehicle interface device of claim 1, further comprising:
- at least one electroacoustic transducer configured to generate an audible signal; and
- wherein the processor controls the at least one electroacoustic transducer and is configured to:
  - generate a control signal to cause the at least one electroacoustic transducer to generate an audio object corresponding to the angular position of the identified object relative to the vehicle; and
  - modify the control signal to progressively change a perceived spatial location of the audio object to represent changes in the angular position of the identified object relative to the vehicle.

10. A vehicle comprising the vehicle interface device of claim 1.

11. A method of generating a haptic indication of a potential hazard, the method comprising:
- in dependence on object data relating to an identified object representing a potential hazard, determining an angular position of the identified object relative to a vehicle;
- generating a control signal for activating a plurality of haptic generators to represent changes in the angular position of the identified object relative to the vehicle; and
- modifying the control signal to progressively increase a magnitude of a haptic signal generated by a first one of the plurality of haptic generators while progressively decreasing a magnitude of a haptic signal generated by a second one of the plurality of haptic generators positioned adjacent to the first one of the plurality of haptic generators to represent a change in the relative angular position of the identified object.

12. The method of claim 11, further comprising receiving the object data from a sensor disposed on the vehicle.

13. The method of claim 11, wherein each haptic generator comprises:
- a vibration generator;
- an ultrasonic transducer for generating an ultrasonic signal; or
- an air vent configured to generate a jet of air.

14. The method of claim 11, wherein the plurality of haptic generators are disposed within a seat in an occupant compartment of the vehicle, optionally determining occupant contact with the seat, and controlling activation of the plurality of haptic generators in dependence on occupant contact with the seat.

15. The method of claim 11, further comprising:
- determining a trajectory of the identified object in dependence on the identified object data and modifying the respective haptic signals generated by the plurality of haptic generators in dependence on the determined trajectory; and/or
- determining a time to collision in dependence on the identified object data and modifying the respective haptic signals generated by the plurality of haptic generators in dependence on the determined time to collision; and/or
- determining a nature of the identified object in dependence on the identified object data and modifying the respective haptic signals generated by the plurality of haptic generators in dependence on the determined nature.

16. The method of claim 11, further comprising modifying the respective haptic signals generated by the plurality of haptic generators by changing one or more of the following parameters: amplitude, frequency, magnitude, haptic pattern, and pattern form.

17. The method of claim 11, further comprising generating a visual indication of a potential hazard, comprising:
- displaying a visual indicator at a display position corresponding to the angular position of the identified object relative to the vehicle; and
- progressively changing the display position of the visual indicator at least substantially to match changes in the angular position of the identified object relative to the vehicle.

18. The method of 11, further comprising generating an audible indication of a potential hazard, comprising:
- generating an audible signal for providing an indication of the angular position of the object relative to the vehicle; and
- progressively modifying the generated audible signal to represent changes in the angular position of the identified object relative to the vehicle.

19. The method of claim 11, wherein the plurality of haptic generators are disposed in a seat, and wherein the method further comprises:
- weighing an occupant of the seat; and
- controlling the plurality of haptic generators in dependence on a measured weight of the occupant.

20. The vehicle interface device of claim 1, wherein the plurality of haptic generators are disposed in a seat, wherein the seat comprises a weight sensor, and wherein the processor is further configured to control the plurality of haptic generators in dependence on a weight of an occupant of the seat measured by the weight sensor.

* * * * *

UNITED STATES PATENT AND TRADEMARK OFFICE
CERTIFICATE OF CORRECTION

PATENT NO.         : 10,229,595 B2
APPLICATION NO.    : 15/540153
DATED              : March 12, 2019
INVENTOR(S)        : Loeillet et al.

Page 1 of 1

It is certified that error appears in the above-identified patent and that said Letters Patent is hereby corrected as shown below:

In the Specification

Column 14, Line 33:
Please correct "(12V)" to read -- (I2V) --

Column 20, Line 22:
Please correct "(12V))" to read -- (I2V)) --

In the Claims

Column 34, Line 9, Claim 3:
Please correct "comprise a vibration" to read -- comprise vibration --

Column 34, Line 25, Claim 5:
Please correct "are is disposed" to read -- are disposed --

Signed and Sealed this
Second Day of July, 2019

Andrei Iancu
*Director of the United States Patent and Trademark Office*